US006244987B1

(12) United States Patent
Ohsuga et al.

(10) Patent No.: US 6,244,987 B1
(45) Date of Patent: *Jun. 12, 2001

(54) PHYSICAL EXERCISE SYSTEM HAVING A VIRTUAL REALITY ENVIRONMENT CONTROLLED BY A USER'S MOVEMENT

(75) Inventors: Mieko Ohsuga; Futomi Shimono; Masahiro Kimura; Mitsuo Maeda; Isao Mizukura, all of Tokyo (JP)

(73) Assignee: Mitsubishi Denki Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/866,302

(22) Filed: May 30, 1997

(30) Foreign Application Priority Data

Nov. 25, 1996 (JP) .................................................. 8-313860

(51) Int. Cl.⁷ ..................................................... A63B 24/00
(52) U.S. Cl. ................................ 482/4; 482/9; 482/902; 434/247
(58) Field of Search ................................. 482/9, 902, 4, 482/247

(56) References Cited

U.S. PATENT DOCUMENTS

| 4,645,459 | * | 2/1987 | Graf et al. | ............................... | 434/43 |
| 5,234,346 | * | 8/1993 | Rice | ....................................... | 434/316 |
| 5,385,519 | * | 1/1995 | Hsu et al. | ............................. | 482/902 |

(List continued on next page.)

FOREIGN PATENT DOCUMENTS

| 57-059534 | 4/1982 | (JP) | ................................. | A61H/1/02 |
| 63-120606 | 8/1988 | (JP) | . | |
| 03-015812 | 1/1991 | (JP) | ............................... | G02B/17/08 |
| 04-080711 | 3/1992 | (JP) | ............................... | G02B/27/18 |
| 4-348761 | 12/1992 | (JP) | . | |
| 06-000231 | 1/1994 | (JP) | ............................... | A63B/22/06 |
| 06-011767 | 1/1994 | (JP) | ............................... | G03B/21/10 |
| 06-154354 | 6/1994 | (JP) | ............................... | A63B/22/06 |
| 7-80096 | 3/1995 | (JP) | . | |

OTHER PUBLICATIONS

Fisher et al., Virtual Environment Display System, NASA Ames Research Center, ACM 1986 Workshop on Interactive 3D Graphics, Chapel Hill NC, Oct. 1986.*

Primary Examiner—Mickey Yu
Assistant Examiner—Victor K. Hwang
(74) Attorney, Agent, or Firm—Sughrue, Mion, Zinn, Macpeak & Seas, PLLC

(57) ABSTRACT

A wellness system comprises an exercise load providing unit for providing a load of a physical exercise for a user, and for measuring a movement of the user who is doing the physical exercise, a virtual reality environment providing unit for providing the user with a virtual reality environment that can cause user's plural senses such as the sense of sight, hearing, touch, and smell to work, according to the contents of the virtual reality environment, and a control unit for controlling the virtual reality environment provided by the virtual reality environment providing unit according to the user's movement measured by the exercise load providing unit. Furthermore, when providing the virtual reality environment, the virtual reality environment providing unit displays an image which produces the virtual reality environment by setting its angle of view to be larger than an angle of view of a corresponding object or scene which was shot. A step dynamic image method is used to present the image data and involves storing a plurality of dynamic image cuts taken at a plurality of places in a path through which a user will virtually traverse and replaying the plurality of dynamic image cuts cut by cut according to a physical exercise that the user does and synchronizing each dynamic image cut with a corresponding sound, wind and fragrance.

2 Claims, 13 Drawing Sheets

U.S. PATENT DOCUMENTS

| | | | |
|---|---|---|---|
| 5,462,503 | * 10/1995 | Benjamin et al. | 482/902 |
| 5,495,576 | * 2/1996 | Ritchey | 345/425 |
| 5,562,572 | * 10/1996 | Carmein | 482/902 |
| 5,577,981 | * 11/1996 | Jarvik | 482/902 |
| 5,580,249 | * 12/1996 | Jacobsen et al. | 434/255 |
| 5,584,700 | * 12/1996 | Feldman et al. | 482/902 |
| 5,610,674 | * 3/1997 | Martin | 352/85 |
| 5,702,323 | * 12/1997 | Poulton | 482/8 |
| 5,779,596 | * 7/1998 | Weber | 482/902 |
| 5,905,499 | * 5/1999 | McDowall et al. | 345/419 |

\* cited by examiner

WHEN TAKING AN IMAGE OF A SCENE

WHEN DISPLAYING THE IMAGE

○ SHOOTING POINT

⊘ FORK

MAIN PATH

START/END    BRANCH PATHS

PHYSICAL EXERCISE SYSTEM HAVING A VIRTUAL REALITY ENVIRONMENT CONTROLLED BY A USER'S MOVEMENT

BACKGROUND OF THE INVENTION

1. Field of the Invention

The present invention relates to a wellness system which can provide a user with artificial reality which involves a plurality of human senses integrated, i.e., a virtual reality environment which causes user's plural human senses such as the sense of sight, hearing, touch, and smell to work. More particularly, the present invention relates to a wellness system which can provide a user with a virtual reality environment which can add a sense of sophisticated realism and the contents of a physical exercise which varies according to the virtual reality environment, by acquiring information about a movement and a physiological condition of the user who is doing a physical exercise and then providing feedback of the information to the wellness system, also provide a user who is isolated from a real world with a contact with the real world by providing a virtual reality environment for the user, and support communication between the user and another user, or between the user and a medical authorized person or a helper.

2. Description of the Prior Art

Each of prior art training machines intended for the improvement of a person's health and physical strength have been widely used as a wellness system. An artificial-experience giving device equipped with a display, for providing a user with artificial experience in doing a target physical training exercise while seeing an image displayed on the screen of the display is one of such training machines. Referring now to FIG. 15, there is illustrated a schematic view of such a prior art artificial-experience giving device equipped with a display as disclosed in Japanese Patent Application Laying Open (KOKAI) No. 7-80096. In the figure, reference numeral 1 denotes a bicycle training machine, 2 denotes a pedal of the machine, 3 denotes a saddle of the machine, 4 denotes a projector which projects an image of an artificial scene, 5 denotes a screen shaped like a half-spherical dome, on which an image from the projector 4 is displayed, 6 denotes a blowing outlet out of which an artificial wind is blowing, 7 denotes a blowing box which produces the artificial wind, and 8 denotes a fragrant substance adding unit for adding a fragrant substance to the artificial wind.

When a user sits on the saddle 3 of the bicycle training machine 1 and then starts to pedal the bicycle training machine, the projector 4 projects an image on the screen 5 shaped like a half-spherical dome and located at the front of the bicycle training machine 1. In general, the image displayed on the screen is concerned with an artificial scene in the vicinity of an artificial road on which the bicycle is moving, and the image is controlled so that the artificial scene is varied according to the speed at which the user pushes the pedals 2 around, that is, the scene moves at a high speed when the user pedals fast and the scene moves at a low speed when the user pedals slowly.

In addition, a wind from the blowing outlet 6 located at the front of the user is blowing toward the user. The velocity of the wind is controlled according to the speed at which the user pushes the pedals around, similarly to the speed of a variation in the image projected on the screen. Furthermore, the prior art artificial-experience giving device equipped with a display is adapted to control the load of a physical exercise imposed on the user and select a fragrant substance to be added to the artificial wind according to the contents of the image displayed on the screen so as to provide the user with a sense of realism, for example, increase the load of the bicycle training when an image of an upward slope is displayed on the screen, decrease the load of the bicycle training when an image of a downward slope is displayed on the screen, or add a fragrant substance including phytoncide as a major constituent to the artificial wind blowing out of the blowing outlet 6 by means of the fragrant substance adding unit 8 in a situation wherein the user is going on a bicycle trip in a wood.

The prior art wellness system which is so constructed as mentioned above is intended for persons of health or patients who are almost restored in health, but not for early rehabilitation carried out for patients who have no alternative but to be confined to bed, in the presence of a doctor, or according to instructions of a doctor, to prompt early rising and prevent the user from atrophying with disuse. While the prior art wellness system has a measure to display an image in order to cause the user to motivate himself or herself to do rehabilitation, it cannot add a sense of realism to a sufficient degree. Furthermore, the prior art wellness system cannot be intended for patients who are not restored in health; the prior art wellness system cannot provide a load of a physical exercise suitable for the user. In addition, another problem with the prior art wellness system is that since it does not include a means for acquiring information about the user and a real environment in real time and a communications function, the user is not allowed to make contact with a real environment and communicate with another person.

SUMMARY OF THE INVENTION

The present invention is made in order to overcome the above problems. It is therefore an object of the present invention is to provide a wellness system which can provide virtual reality which involves a plurality of human senses integrated for a user, and provide the user with a sense of sophisticated realism and the contents of a physical exercise which the user is to do, and which varies according to the realism, by acquiring information about a movement and a physiological condition of the user who is doing a physical exercise and then providing feedback of the information to the wellness system, thereby giving the user an opportunity of relaxation and refreshment, and causing the user to motivate himself or herself for rehabilitation, which usually bores the user, more effectively, so that a patient who stays in hospital can be helped to do early rising after an operation, and a patient who has been receiving medical treatment for a long time can be prevented from atrophying with disuse.

It is another object to provide a wellness system which can provide a user who is isolated from a real world with a contact with the real world by providing a virtual reality environment for the user, and support communication between the user and another user which is using another wellness system, or between the user and a medical authorized person or a helper, thereby giving the user an opportunity of participating in society, and offering the care of the mental health of the user.

In accordance with one aspect of the present invention, there is provided a wellness system comprising: an exercise load providing unit for providing a load of a physical exercise for a user, and for measuring a movement of a user who is doing the physical exercise; a virtual reality environment providing unit for providing the user with a virtual reality environment according to the contents of the virtual reality environment; and a control unit for controlling the virtual reality environment provided by the virtual reality environment providing unit according to the user's movement measured by the exercise load providing unit. Furthermore, when providing the virtual reality environment, the virtual reality environment providing unit displays an image which produces the virtual reality environment by setting its angle of view to be larger than a corresponding angle of view of a corresponding object or scene which was shot.

In accordance with another aspect of the present invention, there is provided a wellness system comprising: an exercise load providing unit for providing a load of a physical exercise for a user, and for measuring a movement of the user who is doing the physical exercise; a virtual reality environment providing unit for providing the user with a virtual reality environment according to the contents of the virtual reality environment; a physiological and psychological condition evaluating unit for acquiring information representing user's physiological and psychological conditions so as to evaluate the user's physiological and psychological conditions; and a control unit for controlling the load of the physical exercise which the user is doing according to the physiological condition of the user evaluated by the physiological and psychological condition evaluating unit, and for controlling the virtual reality environment provided by the virtual reality environment providing unit according to the user's psychological condition evaluated by the physiological and psychological condition evaluating unit. Furthermore, when providing the virtual reality environment, the virtual reality environment providing unit displays an image which produces the virtual reality environment by setting its angle of view to be larger than a corresponding angle of view of a corresponding object or scene which was shot.

In accordance with another aspect of the present invention, there is provided a wellness system comprising: an exercise load providing unit for providing a load of a physical exercise for a user, and for measuring a movement of the user who is doing the physical exercise; a virtual reality environment providing unit for providing the user with a virtual reality environment according to the contents of the virtual reality environment; and a control unit for controlling the virtual reality environment provided by the virtual reality environment providing unit according to the user's movement measured by the exercise load providing unit. Furthermore, the virtual reality environment providing unit can store a plurality of dynamic image cuts which were taken at a plurality of places of a real environment which is a source of the virtual reality environment, and can replay them cut by cut according to the user's movement measured by the exercise load providing unit.

In accordance with a preferred embodiment of the present invention, the virtual reality environment providing unit can provide the user with a sound, a wind, and fragrance which are associated with each of the plurality of dynamic image cuts, in synchronization with the replay of each of the plurality of dynamic image cuts.

In accordance with another aspect of the present invention, there is provided a wellness system comprising: an exercise load providing unit for providing a load of a physical exercise for a user, and for measuring a movement of the user who is doing the physical exercise; a virtual reality environment providing unit for providing the user with a virtual reality environment according to the contents of the virtual reality environment; and a control unit for controlling the load of the physical exercise provided by the exercise load providing unit. Furthermore, the virtual reality environment providing unit can provide a negative load of a physical exercise to help the user to do the physical exercise.

In accordance with another aspect of the present invention, there is provided a wellness system comprising: an exercise load providing unit for providing a load of a physical exercise for a user, and for measuring a movement of the user who is doing the physical exercise; a virtual reality environment providing unit for providing the user with a virtual reality environment according to the contents of the virtual reality environment; and a control unit for controlling the load of the physical exercise provided by the exercise load providing unit according to a data which defines a pattern of the physical exercise which the user is to do.

In accordance with a preferred embodiment of the present invention, the exercise load providing unit includes a load providing unit for directly providing the load of the physical exercise for the user, a position detecting sensor for detecting a position of the load providing unit, and a speed detecting sensor for detecting a moving speed of the load providing unit. Furthermore, the exercise load providing unit can use outputs from the position detecting sensor and the speed detecting sensor as the data which defines the pattern of the physical exercise which the user is to do.

In accordance with another preferred embodiment of the present invention, the wellness system further comprises an exercise load data input unit through which the data which defines the physical exercise pattern can be input when the user starts physical training using the wellness system.

In accordance with another aspect of the present invention, there is provided a wellness system comprising: an exercise load providing unit for providing a load of a physical exercise for a user, and for measuring a movement of the user who is doing the physical exercise; a virtual reality environment providing unit for providing the user with a virtual reality environment according to the contents of the virtual reality environment; a physiological and psychological condition evaluating unit for acquiring information representing user's physiological and psychological conditions so as to evaluate the user's physiological and psychological conditions; and a control unit for controlling the load of the physical exercise which the user is doing according to the user's physiological condition evaluated by the physiological and psychological condition evaluating unit. Furthermore, the physiological and psychological condition evaluating unit is provided with an electromyogram measuring unit for measuring an electromyogram of a muscle on which the load of the physical exercise is imposed, a muscle active mass estimating unit for estimating an active mass of the muscle from the electromyogram measured by the electromyograph measuring unit.

In accordance with another aspect of the present invention, there is provided a wellness system comprising: an exercise load providing unit for providing a load of a physical exercise for a user, and for measuring a movement of the user who is doing the physical exercise; a virtual reality environment providing unit for providing the user with a virtual reality environment according to the contents of the virtual reality environment; a physiological and psychological condition evaluating unit for acquiring information representing user's physiological and psychological conditions so as to evaluate the user's physiological and psychological conditions; and a control unit for controlling the load of the physical exercise which the user is doing according to the user's physiological condition evaluated by the physiological and psychological condition evaluating unit. Furthermore, the physiological and psychological condition evaluating unit is provided with an electromyograph unit for measuring or obtaining an electromyogram of a muscle of a diseased part in cast of the user by means of electrodes attached to the diseased part in cast, a muscle active mass estimating unit for estimating an active mass of the muscle from the electromyogram obtained by the electromyograph unit. Furthermore, the exercise load providing unit is provided with an electric shock applying unit for applying an electric shock to the user's muscle through other electrodes attached to the diseased part in cast, and an electric shock control unit for controlling the electric shock applying unit according to the active mass of the muscle estimated by the muscle active mass estimating unit, thereby providing a pseudo load of a physical exercise for the user by using electric shocks.

In accordance with another aspect of the present invention, there is provided a wellness system comprising: an exercise load providing unit for providing a load of a physical exercise for a user, and for measuring a movement of the user who is doing the physical exercise; a virtual reality environment providing unit for providing the user with a virtual reality environment according to the contents of the virtual reality environment; a gesture identifying unit for detecting the shape of a part of the user's body which makes a gesture and then identifying the gesture; and a control unit for activating or deactivating the wellness system, controlling the virtual reality environment providing unit, and controlling the exercise load providing unit, according to the user's gesture identified by the gesture identifying unit.

In accordance with another aspect of the present invention, there is provided a wellness system comprising: an exercise load providing unit for providing a load of a physical exercise for a user, and for measuring a movement of the user who is doing the physical exercise; a virtual reality environment providing unit for providing the user with a virtual reality environment according to the contents of the virtual reality environment; and a control unit for controlling the virtual reality environment provided by the virtual reality environment providing unit according to the user's movement measured by the exercise load providing unit. Furthermore, the virtual reality environment providing unit is provided with a unit for taking and capturing an image of at least a part of the user's body, and a unit for superimposing the image captured on an image of the virtual reality environment to be provided to display the composite image when providing the virtual reality environment.

In accordance with another aspect of the present invention, there is provided a wellness system comprising: an exercise load providing unit for providing a load of a physical exercise for a user, and for measuring a movement of the user who is doing the physical exercise; a virtual reality environment providing unit for providing the user with a virtual reality environment according to the contents of the virtual reality environment; a control unit for controlling the virtual reality environment provided by the virtual reality environment providing unit according to the user's movement measured by the exercise load providing unit; a transmission information acquiring unit for acquiring information about an image and a sound associated with the user; a transmission data generating unit for converting the information about an image and a sound acquired by the transmission information acquiring unit and information about a position of the user in the virtual reality environment, which is furnished by the control unit, into communications data in predetermined communications format so as to produce the communications data to be transmitted by way of a communications network; and a received data transforming unit for transforming communications data transmitted to the wellness system by way of the communications network into data required for the virtual reality environment providing unit to construct the virtual reality environment.

In accordance with another aspect of the present invention, there is provided a wellness system comprising: an exercise load providing unit for providing a load of a physical exercise for a user, and for measuring a movement of the user who is doing the physical exercise; a virtual reality environment providing unit for providing the user with a virtual reality environment according to the contents of the virtual reality environment; an image information acquiring unit movably disposed for acquiring information about an image of a real environment that is apart from the user; a sound information acquiring unit movably disposed for acquiring information about sounds made in the real environment that is apart from the user; an environment information acquiring unit movably disposed for acquiring information about the real environment that is apart from the user; and a control unit for moving the image information acquiring unit, the sound information acquiring unit, and the environment information acquiring unit according to the user's movement measured by the exercise load providing unit, and for controlling the virtual reality environment provided by the virtual reality environment providing unit using the information acquired by the image information acquiring unit, the sound information acquiring unit, and the environment information acquiring unit.

In accordance with a preferred embodiment of the present invention, the wellness system further comprises a user's image information acquiring unit for acquiring information about an image of at least a part of the user's body, a user's sound information acquiring unit for acquiring information about a sound that the user makes, an image information providing unit for providing the image information acquired by the user's image information acquiring unit for persons staying in the real environment which is a source of the virtual reality environment, and an image information providing unit for providing the sound information acquired by the user's sound information acquiring unit for persons staying in the real environment which is a source of the virtual reality environment.

Further objects and advantages of the present invention will be apparent from the following description of the preferred embodiments of the invention as illustrated in the accompanying drawings.

DETAILED DESCRIPTION OF THE PREFERRED EMBODIMENTS

Figure 1:
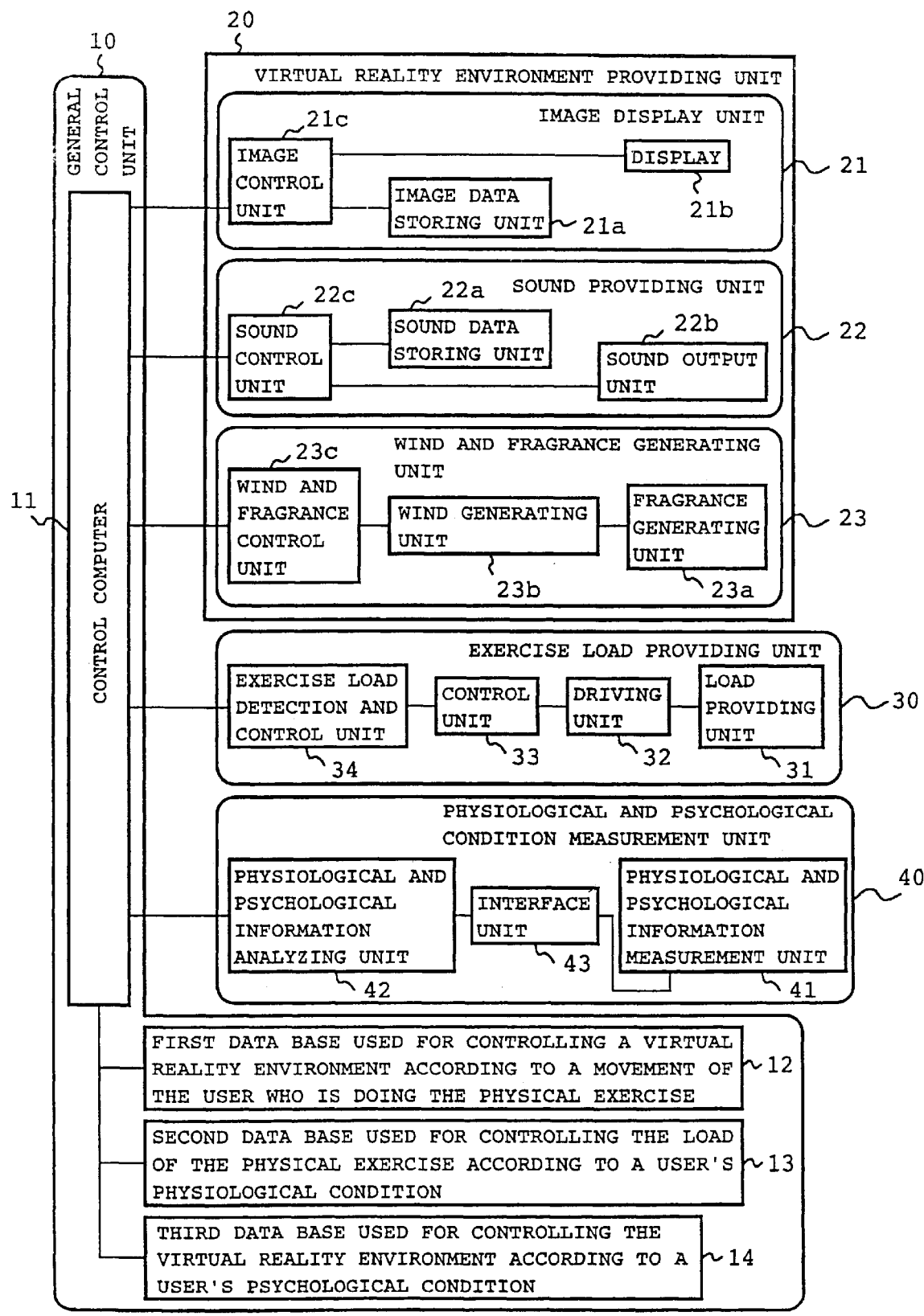
FIG. 1 is a block diagram of a wellness system according to a first embodiment of the present invention.

Referring now to FIG. 1, there is illustrated a block diagram of a wellness system according to a first embodiment of the present invention. In the figure, reference numeral 10 denotes a general control unit for controlling the whole of the wellness system, 11 denotes a control computer disposed in the general control unit 10 for actually carrying out control of the wellness system, 12 denotes a first data base used for controlling a virtual reality environment according to a movement of a user (e.g., a patient or a senior citizen) who is doing a physical exercise, 13 denotes a second data base used for controlling the load of the physical exercise according to a user's physiological condition, and 14 denotes a third data base used for controlling the virtual reality environment according to a user's psychological condition.

Furthermore, reference numeral 20 denotes a virtual reality providing unit which is controlled by the control computer 11 of the general control unit 10, for providing the user with a virtual reality environment according to the contents of the virtual reality environment, 21 denotes an image display unit comprised of an image data storing unit 21a for storing image data about the virtual reality environment, a display 21b on which an image of the virtual reality environment is displayed, and an image control unit 21c for controlling the image data storing unit 21a and display 21b, 22 denotes a sound providing unit comprised of a sound data storing unit 22a for storing sound data about the virtual reality environment, a sound output unit 22b for providing a sound for the virtual reality environment, and a sound control unit 22c for controlling the sound data storing unit 22a and sound output unit 22b, and 23 denotes a wind and fragrance generating unit comprised of a fragrance generating unit 23a for emitting fragrance which constructs a part of the virtual reality environment, a wind generating unit 23b for generating a wind which constructs a part of the virtual reality environment, and a wind and fragrance control unit 23c for controlling the fragrance generating unit 23a and wind generating unit 23b. The virtual reality environment providing unit 20 is provided with the image display unit 21, the sound providing unit 22, and the wind and fragrance generating unit 23.

Reference numeral 30 denotes an exercise load providing unit which is controlled by the control computer 11 of the general control unit 10, for imposing an appropriate exercise load on the user and measuring a movement of the user who is doing the physical exercise. The exercise load providing unit 30 is provided with a load providing unit 31 for imposing an appropriate exercise load on the user, a driving unit 32 for driving the load providing unit 31, a control unit 33 for controlling the driving unit 32, an exercise load detection and control unit 34 for furnishing an instruction from the control computer 11 of the general control unit 10 to the control unit 33 and for detecting a movement of the user who is doing the physical exercise and then informing the control computer 11 of the detected result.

In addition, reference numeral 40 denotes a physiological and psychological condition measurement unit which is controlled by the control computer 11 of the general control unit 10, for measuring information about user's physiological and psychological conditions so as to determine the user's physiological and psychological conditions. The physiological and psychological condition measurement unit 40 is provided with a physiological and psychological information acquiring unit 41 for acquiring information about user's physiological and psychological conditions, a physiological and psychological information analyzing unit 42 for analyzing the information about the user's physiological and psychological conditions acquired by the physiological and psychological information acquiring unit 41 so as to evaluate the user's physiological and psychological conditions, and an interface unit 43 which interfaces between the physiological and psychological information acquiring unit 41 and the physiological and psychological information analyzing unit 42.

In operation, the general control unit 10 controls each of the image display unit 21, sound providing unit 22, and wind and fragrance generating unit 23 by means of the control computer 11 so that they are synchronized with each other so as to generate a virtual reality environment that provides a user with a sense of realism, according to the contents of the virtual reality environment. When controlling the virtual reality environment according to the physical exercise which the user is doing, such as a rehabilitation exercise, the first data base 12 is used. When controlling the virtual reality environment according to the psychological condition of the user, the third data base 14 is used.

When controlling the virtual reality environment according to the physical exercise which the user is doing, such as a rehabilitation exercise, the exercise load detection and control unit 34 of the exercise load providing unit 30 measures a movement of the user who is doing the physical exercise, such as a walking motion of the user, and then varies the image of the virtual reality environment displayed by the image display unit 21 according to the measured walking speed of the user and simultaneously varies the sound to be emitted by the sound providing unit 22 and the wind and fragrance to be provided by the wind and fragrance generating unit 23. For example, by storing environment data on a wood for providing forest bathing in the first data base 12 used for controlling the virtual reality environment according to a movement of the user who is doing the physical exercise, the general control unit 10 can vary an image of the wood to be displayed on the display 21b by the image display unit 21 as the user walks in the virtual reality environment, and simultaneously vary sounds generated within the wood, such as a bird's twittering and rustling of trees, emitted by the sound output unit 22b of the sound providing unit 22, and a wind generated by the wind generating unit 23b of the wind and fragrance generating unit 23 and fragrance, such as a smell of a needle-leaf tree or a smell of a flower, generated by the fragrance generating unit 23a of the wind and fragrance generating unit 23. Accordingly, the user can enjoy virtual forest bathing while doing such a rehabilitation exercise.

The wellness system of this embodiment can store environment data about a scene that can relax the user such as an amusement park in the third data base 14 in order to control the virtual reality environment according to a user's psychological condition. When the physiological and psychological condition measurement unit 40 determines that the user is strung up, the general control unit 10 provides a virtual scene of such an amusement park so as to relax the user by means of the image display unit 21, sound providing unit 22, and wind and fragrance generating unit 23 of the virtual reality environment providing unit 20.

The wellness system can control the load of the physical exercise imposed on the user with reference to the second data base 13 which was prepared in advance, when controlling the exercise load according to the physiological condition of the user. For example, the wellness system can provide the user with a physical exercise to make the user feel good with safety while avoiding danger due to an overload to the user, by adjusting the load of the physical exercise in such a manner that it prevents an overload and a light load of the physical exercise from being imposed on the user.

The wellness system according to this embodiment capable of controlling the virtual reality environment and the load of a physical exercise which the user is doing can be applied to the rehabilitation of a patient who has no alternative but to be confined to bed with illness, a patient who is on the road to recovery, and a person of health.

Figure 2A:
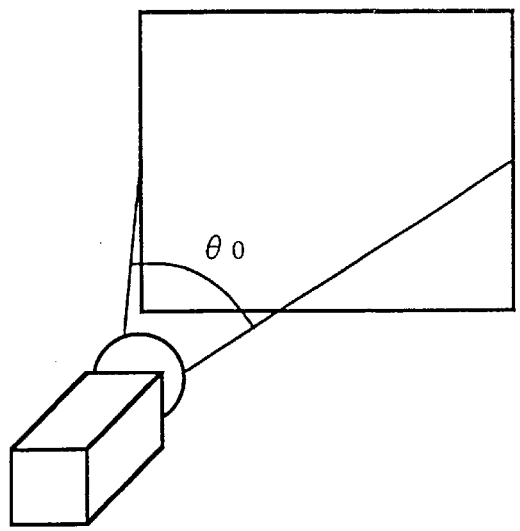
FIG. 2a is a view showing the angle of view of an object when taking an image of the object which is a source of a virtual reality environment to be provided by the wellness system of the first embodiment.
Figure 2B:
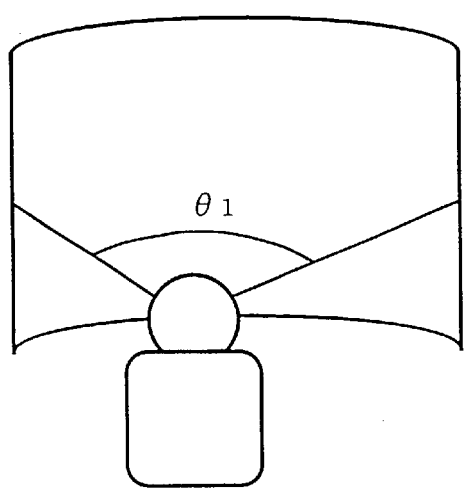
FIG. 2b is a view showing the angle of view of the image of the above object, which produces a virtual reality environment, to be displayed on the screen of the wellness system of the first embodiment.

When the wellness system of the first embodiment displays an image of a virtual reality environment on the image display unit 21 of the virtual reality environment providing unit 20, the angle of view of the image projected on the screen is larger than the angle of view of a corresponding object, i.e., a scene which was shot, that is, which is the source of the image projected. Referring next to FIGS. 2a and 2b, there are illustrated views showing the angle of view in the wellness system of the first embodiment when taking an image of a scene and displaying an image on the screen thereof. FIG. 2a shows the angle of view when taking an image of a scene. FIG. 2b shows the angle of view when displaying the image on the screen. As shown in FIG. 2a, a dynamic image of a scene is taken with an angle of view of $\theta 0$ by a video camera or the like. Then, the image data taken by the video camera is stored in the image storing unit 21a of the image display unit 21. When displaying the image on the screen of the image display unit, the image control unit 21c of the image display unit 21 reads the image data stored in the image storing unit 21a in response to a control signal furnished by the control computer 11 of the general control unit 10, and displays the image on the display 21b with a larger angle of view of $\theta 1$ as shown in FIG. 2b. The display 21b which displays an image on the screen thereof with a large angle of view can be implemented via an image display device comprising a display board for displaying an image having a barrel-shaped distortion and an optical system for making a distortion correction to the image, or a head-mount type image display device. Thus, since the image display unit of the wellness system of this embodiment displays an image with the angle of view of $\theta 1$ which is larger than the angle of view of $\theta 0$ when making a video film of a corresponding scene, it causes the user to feel as if the user enters the scene displayed on the screen and hence to get himself or herself absorbed in the virtual reality environment.

Instead of a real-life dynamic image which was taken with a video camera, static images, or computer-generated graphic images, i.e., computer graphics (CG) which are not real-life images, can be used as images which produce a virtual reality environment to be provided for a user.

Figure 3:
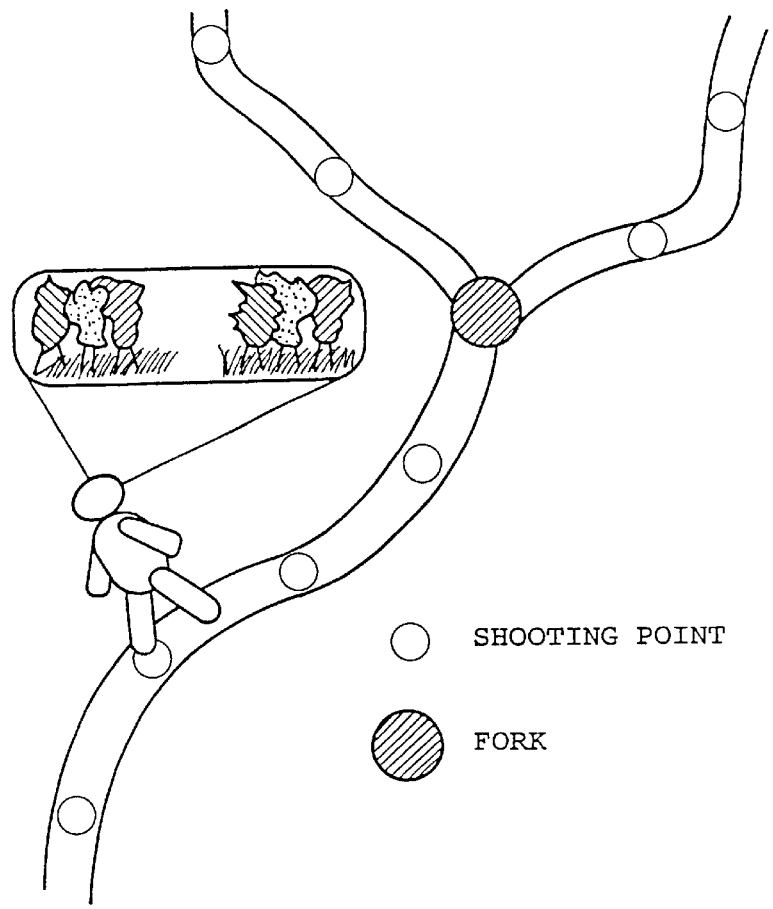
FIG. 3 is a view showing an example of a method of making image data for a wellness system of a second embodiment of the present invention.

Referring next to FIG. 3, there is illustrated a view showing an example of a method of making image data which is used for a wellness system of a second embodiment of the present invention. The wellness system of the second embodiment is structured similarly to that of the above-mentioned first embodiment shown in FIG. 1, except that the preparation of image data stored in the image storing unit 21a of the image display unit 21 disposed within the virtual reality environment providing unit 20 and control data stored in the first data base 12 of the general control unit 10 used for controlling the virtual reality environment according to a movement of the user who is doing the physical exercise are carried out by following a step dynamic image method. The step dynamic image method is comprised of steps of storing a plurality of dynamic image cuts which were taken at a plurality of places in a path through which the user will walk or run in the virtual reality environment to be provided by the wellness system in the virtual reality environment providing unit 20, and replaying the plurality of dynamic image cuts cut by cut according to a physical exercise that the user does and producing a corresponding sound, wind, and fragrance in synchronization with each of the plurality of dynamic image cuts replayed by means of the virtual reality environment providing unit 20.

As shown in FIG. 3, when the virtual reality environment provided for the user is concerned about a situation in which the user walk in a park, corresponding dynamic image cuts are made at the park which is to be the stage where the user does the physical exercise in the virtual reality environment. At that time, a plurality of places where a plurality of dynamic image cuts are to be taken respectively are defined so that they are arranged at predetermined intervals of, for example, one foot or a few feet of an average man. Then, each dynamic image cut is being made at each of the places arranged as mentioned above for a predetermined time, e.g., tens of seconds with a video camera held in a horizontal state, while positioning the video camera at eye level of an average man and pointing the video camera to the direction which the user is to be headed in the virtual reality environment, for example, the direction of the tangent line of a road on which the user will walk in the virtual reality environment. Furthermore, at a fork of the path, one dynamic image cut of a scene showing how many streets the path is divided to is taken with the video camera. A plurality of dynamic image cuts thus taken are compressed with an image compressing and coding method such as the Moving Picture Experts Group (MPEG) compressing and coding method defined by International Standards Organization (ISO), and then the compressed and coded data are stored in the image storing unit 21a of the image display unit 21.

At each of the plural places where each of the plurality of dynamic image cuts is taken, information about sounds is recorded at the same time. In order to offer a stereophonic sound in the virtual reality environment, sounds from different directions must be recorded separately by using a good-directional microphone. By adding composite tone and sound data recorded separately to the sounds thus recorded while replaying each of the plural dynamic image cuts taken, sound data which correspond to each of the plural dynamic image cuts to be displayed on the screen are generated and recorded in the sound data storing unit 22a. Furthermore, information about a plurality of sound sources and their positions can be generated and stored in the sound data storing unit 22a in order to offer a stereophonic sound. For example, in order to offer a virtual reality environment wherein a small bird is flying while twittering, the position of the small bird, the dimensions of the vicinity of the bird which can reflect a sound which the bird makes such as the bird's twittering and which a human being can hear, the reflectivity of sound against the vicinity of the bird, and the timing of the twittering are stored as sound data which correspond to one dynamic image cut to be displayed on the screen as well as the phrase of the twittering of the small bird. Control information showing a correspondence between the plurality of dynamic image cuts and sound data is stored in the first data base 12 used for controlling the virtual reality environment according to a movement of the user who is doing the physical exercise. Instead of creating sound data throughout the total time of the plurality of dynamic image cuts, only sound data can be generated for each scene including a sound in each of the plural dynamic image cuts and then the timing data showing the timing of triggering the generation of a sound in replaying each of the plural dynamic image cuts, i.e., the timing data showing the number of a frame of the cut from which the generation of the sound is started is added to the control information.

Similarly, at each of the plural places where each of the plurality of dynamic image cuts is taken, information about the velocity of a wind blowing, and fragrance is acquired at the same time. Preferably, the information about the wind is recorded by using an air speedometer and an anemoscope. Alternatively, a person can record the velocity and direction of a blowing wind that he or she has noticed as the information about the wind. After that, control information about a wind and fragrance which corresponds to each of the plural dynamic image cuts to be displayed on the screen is generated on the basis of the above information recorded while replaying each of the plural dynamic image cuts on the screen, and is stored in the first data base 12 used for controlling the virtual reality environment according to a movement of the user who is doing the physical exercise. A set of the timing data showing the timing of blowing a wind and generating fragrance and parameters required for generating the wind and fragrance is stored as the control information, similarly to the case of sound data. In addition, at each of the plural places where each of the plurality of dynamic image cuts is taken, the inclination of land and condition of land such as its hardness and construction materials are measured and corresponding control parameters are stored in the first data base 12 used for controlling the virtual reality environment according to a movement of the user who is doing the physical exercise.

When offering the virtual reality environment to the user according to the contents of the virtual reality environment, the control computer 11 of the general control unit 10 selects one of the plural dynamic image cuts to be replayed next according to information stored in the first data base 12 used for controlling the virtual reality environment according to a movement of the user who is doing the physical exercise, and then furnished the selected cut to the image display unit 21. After that, the control computer 11 delivers an instruction to start the replay of the next dynamic image cut to the image control unit 21c of the image display unit 21 in synchronization when the exercise load detection and control unit 34 of the exercise load providing unit 30 detects a stepping motion of the user, that is, every time the user makes one step. When the user moves along the path in the virtual reality environment and then reaches a fork, the control unit can project an image including at least a part of the human body of the user who can show the direction in which the user is headed with a gesture on the screen, as described below in a seventh embodiment of the present invention, so as to cause the user to select a path through which the user wants to move by making a gesture, the meaning of which can be identified by the wellness system. Furthermore, the control computer 11 of the general control unit 10 reads control information about sounds, a wind and fragrance which correspond to the next dynamic image cut to be displayed and control information about the load of a physical exercise which the user will do, and furnishes the control information to the sound providing unit 22, the wind and fragrance unit 23, and the exercise load providing unit 30.

When the image control unit 21c of the image display unit 21 receives an instruction to start the replay of a next dynamic image cut, it reads image information about the next cut from the image storing unit 21a and decompresses the image information which was compressed using the MPEG compression method by means of an image expanding circuit board not shown in FIG. 1. Then, the image control unit 21c of the image display unit 21 furnishes the expanded image information to the display 21b so as to provide the user with the next dynamic image cut. When the image control unit 21c of the image display unit 21 does not receive the instruction to start the replay of a next cut even though the replay of the preceding dynamic image cut has been completed, that is, when the movement of user is very slow or the user stops, the image control unit returns to the first frame of the same dynamic image cut and repeats the replay of the same dynamic image cut. Accordingly, when the user makes a step forward, the scene on-screen such as a park changes to the next dynamic image cut which was taken at a one-step forward place, and simultaneously the sound control unit 22c of the sound providing unit 22 provides a stereophonic sound such as a bird's twittering, or rustling of leaves of trees which corresponds to the on-screen image according to sound data stored in the sound data storing unit 22a by means of the sound output unit 22b, and the wind and fragrance control unit 23c of the wind and fragrance generating unit 23 controls the wind generating unit 23b and the fragrance generating unit 23a under control of the control computer 11 of the general control unit 10 so as to provide a wind and fragrance such as a smell of a flower which correspond to the image on-screen. Furthermore, the load providing unit 31 of the exercise load providing unit 30 which is controlled by the control computer 11 of the general control unit 10 provides a load of a physical exercise according to the image of a scene displayed on the screen. Accordingly, the user can feel as if the user walk in a real-life place which is the source of the virtual reality environment on-screen. For example, the user can feel a difference of conditions of the road surface on which the user steps, or the angle between the user's legs and a slope.

Thus, since the wellness system according to the second embodiment of the present invention can generate image data and control data by means of the step dynamic image method, the wellness system can cause the user to have a sense that the user moves in a real-life space without causing the user to do a physical exercise to excess according to the image on-screen.

In order to reduce a feeling of physical disorder (e.g., sickness) due to discontinuity of images which appears when the user's viewpoint changes, i.e., a next dynamic image cut is displayed on the screen, the shooting of a series of plural dynamic image cuts must be carried out for only an object which hardly moves such as trees and grass without taking a picture of persons walking and automobiles in the vicinity of the shooting place. Fractal small movements such as rustling of leaves of trees are desirable because discontinuity between dynamic image cuts is not prominent. Furthermore, in order to reduce discontinuity in replaying the same dynamic image cut again, it is preferable to trim each of the plural dynamic image cuts so that the image of the first frame of each of the plural dynamic image cuts is similar to that of the last frame of each of the plural dynamic image cuts. Similarly, sound data mainly including data about a sound which does not vary rapidly or a series of similar sounds can be incorporated into the dynamic image together with data about a sound which does not provide the user with an unnatural feeling even though the replay of the sound is terminated in the middle of the replay, such as a bird's twittering or an insect's chirping.

Figure 4:
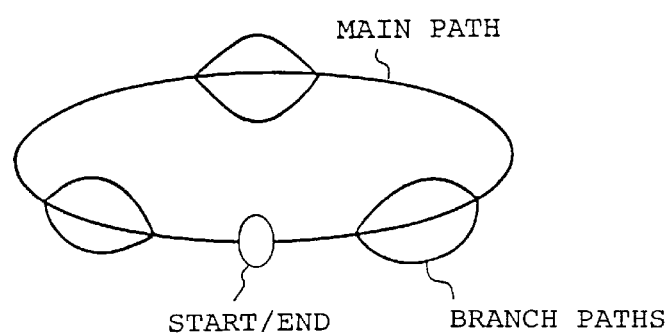
FIG. 4 is a view showing an example of a path on which the user will move in a virtual space provided by the wellness system of the second embodiment of the present invention.

Referring next to FIG. 4, there is illustrated a view showing an example of a path through which the user walks in a virtual space. As shown in FIG. 4, the path is comprised of a main path shaped like a loop and a plurality of branches each including branch paths all of which are connected to the main path. Furthermore, the path is a one-way road. Accordingly, explosive increases in the number of nodes and the number of needed dynamic image cuts which are caused by the branches as shown in FIG. 4 can be prevented. Furthermore, since the user cannot go back on the path, it is desirable to provide the user with an image in which when the user returns to the main path from a branch path, the user cannot see the exit of another branch. The image cannot be necessarily the one which was taken at a real shooting place. It is preferable to reconstruct such the image by using real-life data recorded so that the user does not have an unnatural feeling. Furthermore, measures not to cause the brightness of the screen, the direction of the sun, and the weather to vary discontinuously among successive dynamic image cuts are needed. Modification of the plural dynamic image cuts which is carried out after the image shooting is effective in order to eliminate the discontinuity, too.

As previously explained, the image display unit 21 and sound providing unit 22 according to this embodiment are disposed separately, and image data and sound data are stored separately in the respective storing units. If the wellness system does not offer a stereophonic sound, both of the image display unit 21 and sound providing unit 22 can be formed in one piece which can compress image and sound which are synchronized with each other and store them therein.

Other numerous variants may be made in the exemplary embodiment mentioned above. Instead of creating image data, sound data, and control information on the basis of a plurality of real-life dynamic image cuts, it is preferable to write a scenario which defines the structure of a virtual reality environment to be provided for the user and variations in the virtual reality environment, and create animation image data by using computer graphics, and sound data and control information according to the scenario.

Furthermore, instead of providing a virtual reality environment in which the user can walk while stepping, the wellness system of this second embodiment can offer a virtual reality environment in which the user can work at oars by hand.

In addition, by varying the height of the user's eyes, or setting the spacing between two adjacent shooting places to a distance which is different from the stride of an average person, the wellness system can cause the user to feel as if the user become a child or another creature that is completely different from a human being. Thus, the wellness system of this embodiment can provide a person who usually view a real world while sitting on a wheelchair with a feeling of a person who is walking. On the contrary, the wellness system of this embodiment can also provide a person who can walk normally with a feeling of a person who usually view a real world while sitting on a wheelchair.

Figure 5:
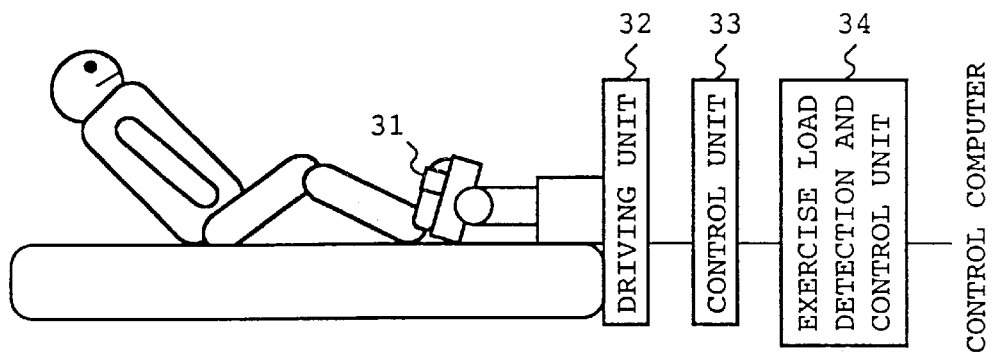
FIG. 5 is a view showing an exercise load providing unit of a wellness system of a third embodiment of the present invention.

Referring next to FIG. 5, there is illustrated a schematic diagram of the exercise load providing unit 30 of a wellness system of a third embodiment of the present invention. The exercise load providing unit 30 of this third embodiment is adapted to provide the user with a negative load of a physical exercise for helping the user to do a physical exercise. The structure of the wellness system of the third embodiment of the present invention is the same as that of the first embodiment shown in FIG. 1, and the same components as those shown in FIG. 1 are designated by the same reference numerals. Therefore, the description about the structure of the wellness system of this embodiment will be omitted hereinafter.

Figure 6:
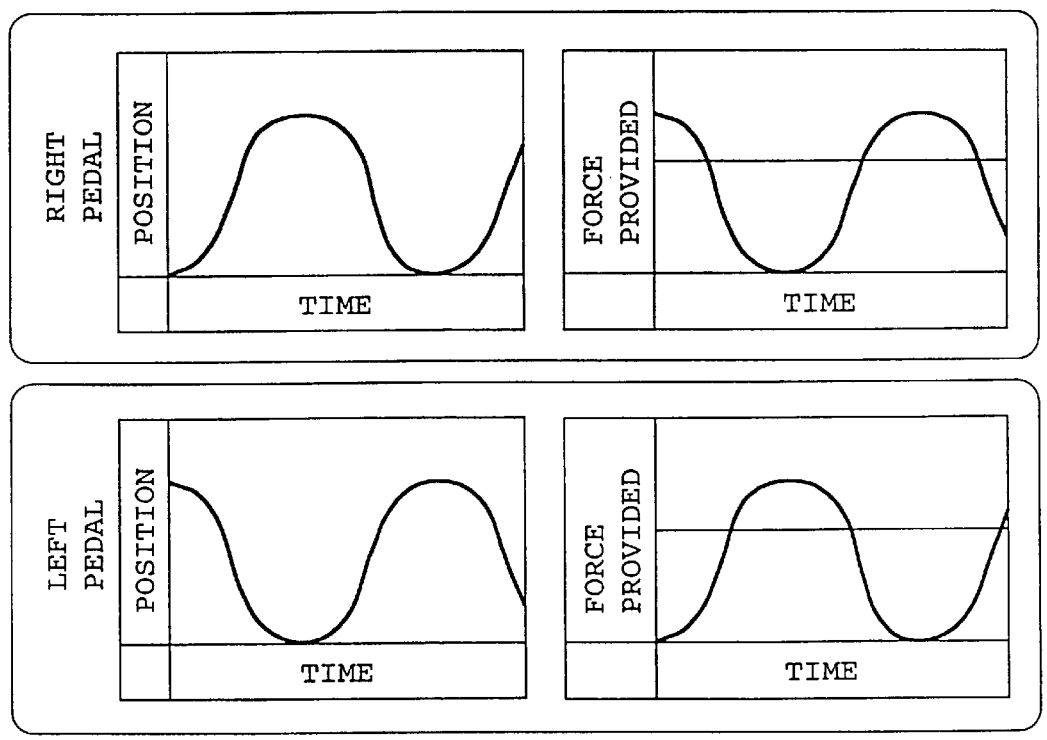
FIG. 6 is a view showing torques and positions of both pedals of a load providing unit of the exercise load providing unit shown in FIG. 5.

In operation, the exercise load detection and control unit 34 of the exercise load providing unit 30 furnishes an instruction to offer a negative load of a physical exercise to the control unit 33 according to an instruction from the control computer 11 of the general control unit 10. The provision of the negative load of a physical exercise means that the wellness system helps the user to do a physical exercise by exerting forces on the user's legs, for example. The load providing unit 31 of this embodiment is provided with left and right pedals for securing the user's left and right feet to the pedals, respectively, so that both of the user's feet are not separate from the pedals, so as to exert forces from the driving unit 32 on the pedals and hence the user's feet and legs. The negative load of a physical exercise imposed on the user causes the user to bend and stretch the user's knees alternately. The control unit 33 controls the driving unit 32 so that the driving unit 32 sets the forces, i.e., torques and positions of both of the pedals of the load providing unit 31, as shown in FIG. 6. As can be seen from FIG. 6, the driving unit 32 moves the positions of the right and left pedals in such a manner that they have opposite phases, and the driving unit 32 also sets the forces provided by the right and left pedals in such a manner that they have opposite phases. It is desirable that a specialist such as a doctor or a rehabilitation doctor sets the magnitude of the forces to be exerted on the load providing unit 31 and hence the user according to recovery of the user, to the general control unit 10. More specifically, a method as described in a fourth embodiment of the present invention can be applied.

In order to assure safety, it is preferable that there is provided an emergency stop switch located in the vicinity of the wellness system for stopping the supply of the load of a physical exercise. In addition, it is preferable that both of the pedals for securing the user's feet to the load providing unit 31 are adapted to automatically release the user's feet when too big a force is exerted on at least one of the pedals, and there is provided an emergency switch for releasing the user's feet from the pedals.

Accordingly, the user who cannot move the user's legs by himself or herself can do a passive rehabilitation exercise which is usually provided by a rehabilitation doctor by using the wellness system of this embodiment. The user can easily do a physical exercise which lasts a short time over and over again a day. It is thus expected that the user's stiff muscle or joint become movable and then the user can move his or her muscle and joint by himself or herself. Furthermore, the wellness system can provide the user who cannot move with a feeling of moving in a virtual reality environment by virtue of a passive physical exercise. For example, when the user pedals as shown in FIG. 5, the wellness system offers a feeling of walking. Therefore, the user can temporarily get rid of the stress of being confined to a bed and therefore mentally refresh himself or herself. Furthermore, since the wellness system can help the user who cannot do a physical exercise without any efforts to do an exercise when the user starts to be trained, the user can easily face the training. As a result, the wellness system of this embodiment can prevent muscles or the like of the user from atrophying with disuse.

In the above description, a knee bending exercise is explained as an example. The wellness system of this embodiment can also be applied to a physical exercise of an ankle, an arm, or a wrist.

Figure 7:
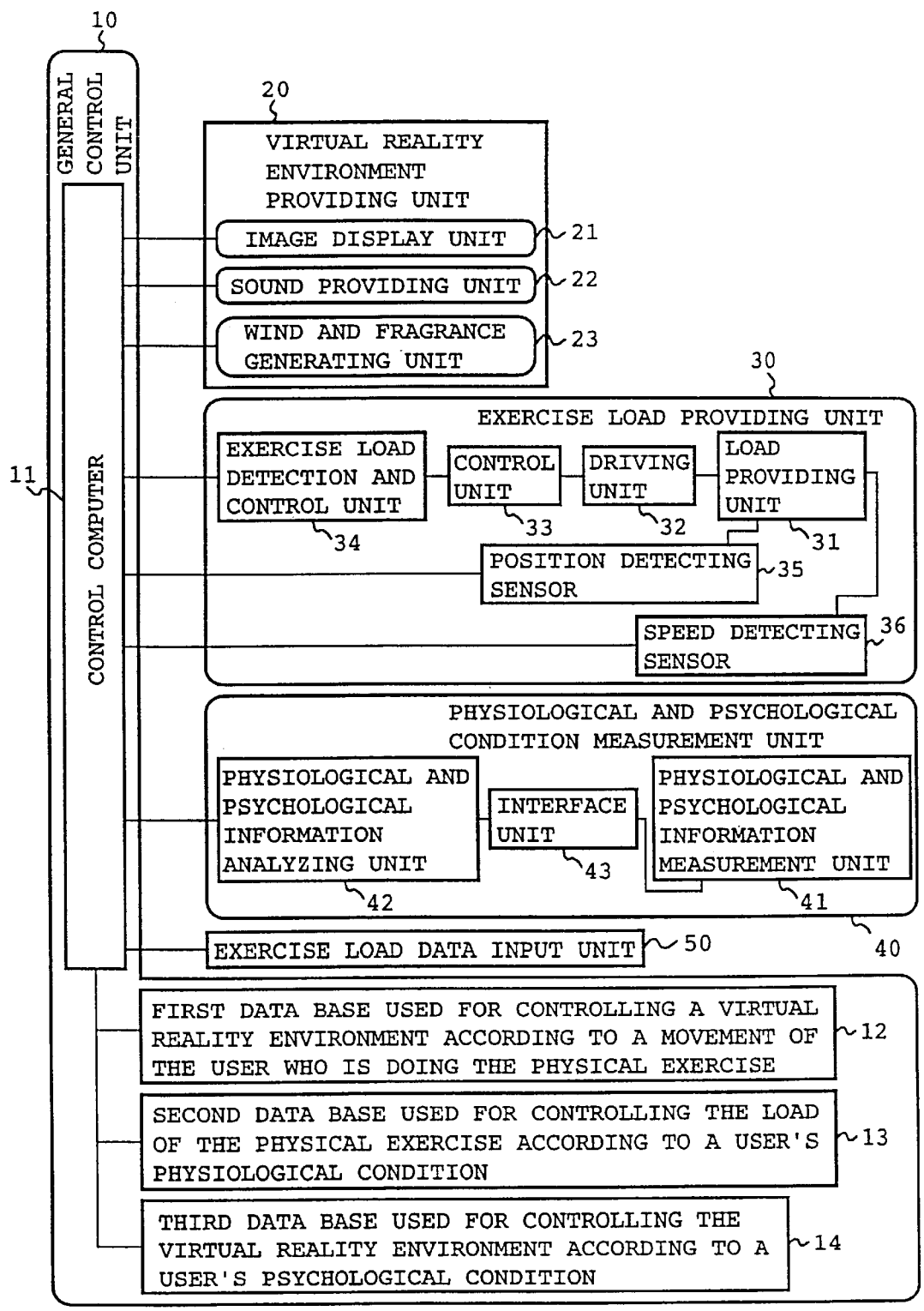
FIG. 7 is a block diagram of a wellness system according to a fourth embodiment of the present invention.

Referring next to FIG. 7, there is illustrated a block diagram showing the structure of a wellness system of a fourth embodiment of the present invention. The same components as those shown in FIG. 1 of the wellness system of the first embodiment are designated by the same reference numerals, and the description about the components will be omitted hereinafter. The wellness system of the fourth embodiment is adapted to provide a load of a physical exercise suitable for the user according to an exercise pattern such as a movable range of the user, and an acceptable walking or pedaling speed, which have been input by a doctor or a rehabilitation doctor when the user starts to be trained. Furthermore, the wellness system can learn, i.e., store the exercise pattern which has been input. In FIG. 7, reference numeral 35 denotes a position detecting sensor disposed in the exercise load providing unit 30, for detecting the position of the load providing unit 31 and then furnishing the detected result to the control computer 11 of the general control unit 10, 36 denotes a speed detecting sensor disposed in the exercise load providing unit 30, for detecting the moving speed of the load providing unit 31 and then furnishing the detected result to the control computer 11 of the general control unit 10, and 50 denotes an exercise load data input unit through which a doctor or a rehabilitation doctor inputs a setting data which defines the exercise pattern such as a movable range of the user, and an acceptable walking or pedaling speed, which depend on the contents of a rehabilitation physical exercise which the user is to do.

Before starting rehabilitation, a doctor or a rehabilitation doctor adjusts the load providing unit 31 of the exercise load providing unit 30 manually according to an exercise pattern suitable for the rehabilitation physical exercise which the user will do. The position detecting sensor 35 and speed detecting sensor 36 of the exercise load providing unit 30 measure the position and moving speed of the load providing unit which are determined by the exercise pattern set by a doctor or a rehabilitation doctor and then furnish the position and moving speed data measured to the general control unit 10. The control computer 11 of the general control unit 10 stores the data furnished to the control unit in the first data base 12 used for controlling the virtual reality environment according to a movement of the user who is doing the physical exercise. When the user starts to do the rehabilitation physical exercise, the control computer 11 furnishes the above-mentioned data stored in the first data base 12 to the exercise load detection and control unit 34 of the exercise load providing unit 30. As a result, the driving unit 32 controlled by the control unit 33 drives the load providing unit 31 according to the data to offer the exercise pattern suitable for the user, which was manually set by a doctor or a rehabilitation doctor.

A doctor or a rehabilitation doctor can directly input a setting numerical data which defines the exercise pattern, such as the track of the load providing unit 31 moving, e.g., the track of moving pedals of the load providing unit, a pattern of changes in the speed of the load providing unit which occur during the travel of the load providing unit, the maximum value of the load of a physical exercise provided by the load providing unit, a movable range of the load providing unit, and an acceptable speed of the load providing unit 31, by means of the exercise load data input unit 50. The setting numerical data which defines the exercise pattern input through the exercise load data input unit 50 are furnished to the general control unit 10. The control computer 11 of the general control unit 10 stores the data furnished to the control unit in the first data base 12 used for controlling the virtual reality environment according to a movement of the user who is doing the physical exercise. When the user starts to do a rehabilitation physical exercise using the wellness system, the control computer 11 reads and furnishes the above-mentioned data stored in the first data base 12 to the exercise load providing unit 30. As a result, the driving unit 32 controlled by the control unit 33 drives the load providing unit 31 according to the data to provide the user with a load of a physical exercise, like the above-mentioned case.

Thus, the wellness system of this embodiment can learn or store a data which defines the exercise pattern, such as the movable range of the user and the acceptable speed, which are set manually or through the exercise load data input unit by a doctor or a rehabilitation doctor when the user starts to be trained, so as to provide a load of a physical exercise for the user according to the exercise pattern. Therefore, the user can repeat a safe rehabilitation physical exercise the contents of which have been set by a rehabilitation doctor or the like. Accordingly, this embodiment can solve a problem that the chance of rehabilitation is reduced due to a short supply of rehabilitation doctors.

Figure 8:
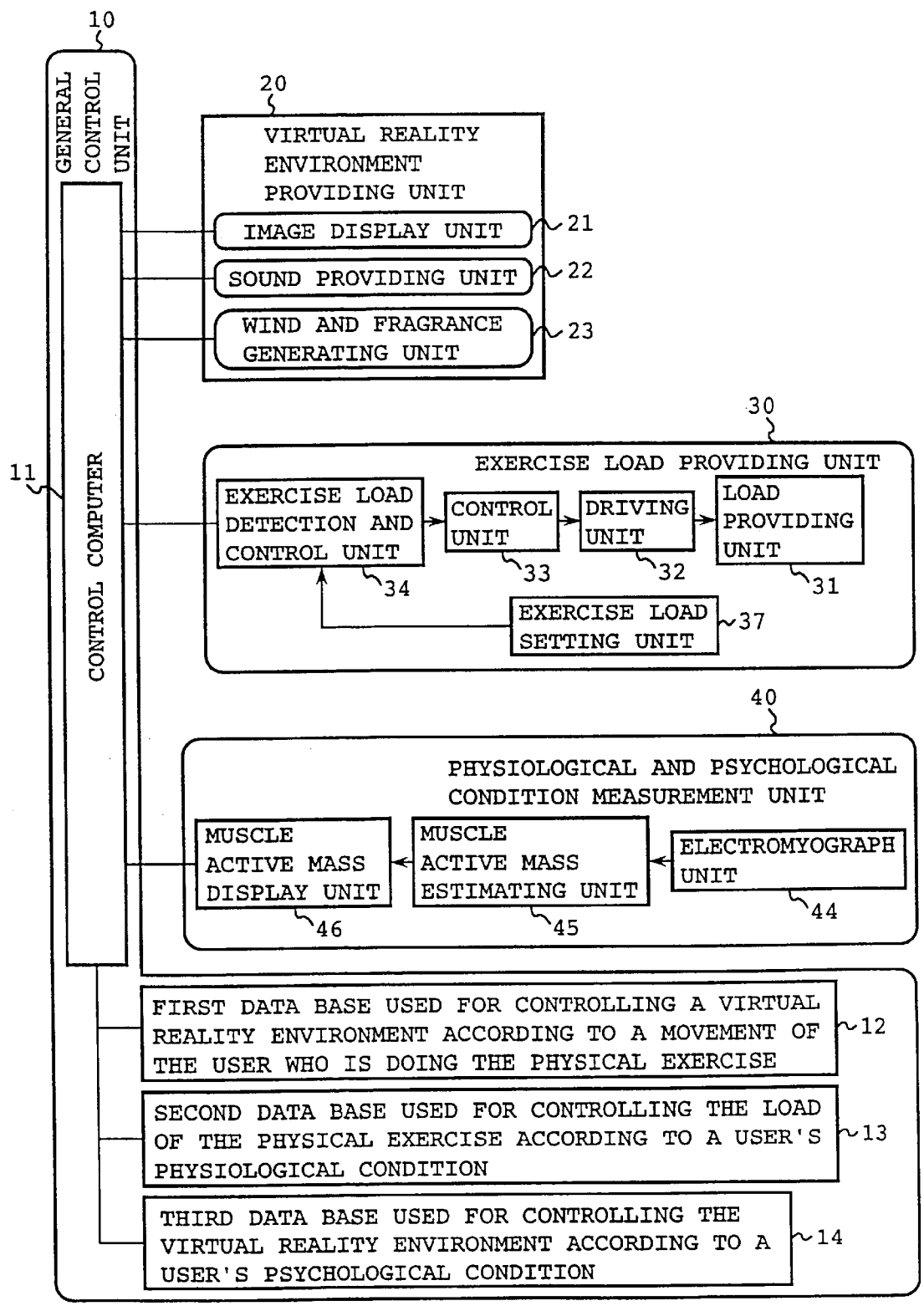
FIG. 8 is a block diagram of a wellness system according to a fifth embodiment of the present invention.

Referring next to FIG. 8, there is illustrated a block diagram showing the structure of a wellness system of a fifth embodiment of the present invention. The same components as those shown in FIG. 1 of the wellness system of the first embodiment are designated by the same reference numerals, and the description about the components will be omitted hereinafter. The wellness system of the fifth embodiment is adapted to control a load of a physical exercise which the user is doing according to the active mass of muscles of the user, thereby preventing the user's muscles from atrophying. In FIG. 8, reference numeral 37 denotes a position detecting sensor which is disposed in the exercise load providing unit 30, and through which the maximum level of a load of a physical exercise is defined, 44 denotes an electromyograph unit for measuring or obtaining the electromyogram of a muscle which is the target of rehabilitation or training offered to the user, 45 denotes a muscle active mass estimating unit for analyzing the electromyogram obtained by the electromyogram detecting unit and then estimating the active mass of the muscle, and 46 denotes a muscle active mass display unit for displaying the active mass of the muscle estimated by the muscle active mass estimating unit in an easy-to-understand form. The physiological and psychological condition measurement unit 40 of the fifth embodiment is provided with the electromyograph unit 44, muscle active mass estimating unit 45, and muscle active mass display unit 46.

In operation, the physiological and psychological condition measurement unit 40 obtains the electromyogram of the muscle which is the target of the rehabilitation or training offered to the user by means of the electromyograph unit 44. The acquisition of the electromyogram by the electromyograph unit 44 is carried out by attaching a pair of disposal electrodes on the body of the user where a general electromyogram of the target muscle (a general electromyogram means an electromyogram of the whole of the muscle) can be obtained and by using a differential amplifier which is generally used for bioelectricity phenomenon measurements and the electric characteristic of which is adjusted for the electromyogram measurement, or a differential amplifier intended for electromyogram measurements. When the electromyogram obtained is furnished to the muscle active mass estimating unit 45, it rectifies the waveform of the electromyogram and then performs low-pass filtering on the rectified electromyogram to convert the electromyogram into a signal having a waveform which represents the active mass of the muscle. Alternatively, the muscle active mass estimating unit 45 can obtain the envelope of the waveform of the electromyogram from the electromyogram from the electromyograph unit 44. The waveform of the low-pass filtered signal represents the mean active mass of the muscle. On the other hand, the envelope of the electromyogram represents the maximum value of the active mass of the muscle which varies with time in one cycle. Such the waveform conversion can produce a signal having a voltage which can rise when the activity of the muscle is brisk and descend when the activity of the muscle is not brisk, that is, which can represent the active mass of the muscle. The waveform of the signal thus obtained can be used as a substitute for the active mass of the muscle. The muscle active mass display unit 46 shows the active mass of the muscle estimated by the muscle active mass estimating unit 45 in an easy-to-understand form for the user, a trainer, and a rehabilitation doctor. For example, the muscle active mass display unit 46 can display the maximum value of the active mass of the muscle in real time by using a level meter, or the waveform of the signal which represents the active mass of the muscle by using a residual image oscilloscope or the like.

On the other hand, the physiological and psychological condition measurement unit 40 furnishes the signal representing the active mass of the muscle to the control computer 11 of the general control unit 10, and then the control computer 11 furnishes it to the exercise load detection and control unit 34 of the exercise load providing unit 30. The exercise load detection and control unit 34 controls the load providing unit 31 according to the signal through the control unit 33 and driving unit 32 so as to provide the user with a load of a physical exercise. Data about loads of a physical exercise predetermined on the basis of mean physical strengths measured according to age and sex are pre-stored in the second data base 13 of the general control unit 10, which is used for controlling the load of a physical exercise according to the user's physiological condition. When the user starts to use the wellness system of this embodiment, the exercise load providing unit 30 applies a load of a physical exercise according to the data stored in the third data base.

The exercise load detection and control unit 34 compares the active mass of the muscle estimated by the active mass estimating unit 45 of the physiological and psychological condition measurement unit 40 with the maximum level of a load of a physical exercise defined by the exercise load setting unit 37 so as to control the load of a physical exercise provided by the load providing unit 31 according to the comparison result. For example, until the estimated active mass of the muscle reaches the defined maximum level of a load of a physical exercise, the exercise load detection and control unit 34 carries out the control of the load of a physical exercise in such a manner that it increases the load of a physical exercise gradually and reduces the load of a physical exercise to zero when the estimated active mass of the muscle exceeds the defined maximum level of the load of a physical exercise. It is needless to say that there is an individual difference in physical strength. Therefore, the exercise load setting unit 37 can be adapted to change the maximum level of the load of a physical exercise during the provision of the load of a physical exercise according to a manual input by the user, a trainer, or a rehabilitation doctor who has determined the change.

Another method of controlling the load of a physical exercise can be applied. The method includes steps of converting activity of the muscle at a certain level or more into a pulse by means of a comparator or the like, furnishing a signal to the exercise load detection and control unit 34 when the number of counts of pulses reaches a certain value, and stopping the provision of the load of a physical exercise in response to the signal. Alternatively, when a certain time, which was predetermined in advance, elapses after the exercise load detection and control unit 34 receives a first pulse which represents the occurrence of the activity of the muscle at a certain level or more, it can stop the provision of the load of a physical exercise.

Preferably, the second data base 13, which is used for controlling the load of the physical exercise according to a user's physiological condition, is adapted to store measured data such as data about the active mass of muscles, which are organized according to the user's identification (ID), age, and sex, every when a user uses the wellness system. Accordingly, the wellness system can set the initial value of the load of a physical exercise which the user is to do and the maximum level of the load of a physical exercise according to the physical strength or the degree of recovery of the user, thereby providing an appropriate load of a physical exercise in accordance with training conditions and the progress of rehabilitation.

Preferably, the wellness system of this embodiment is adapted to control the image display unit 21 of the virtual reality environment providing unit 20 according to the active mass of a muscle estimated by the active mass estimating unit. For example, the wellness system is adapted to vary something in an image on-screen about a game, when the active mass of a user's muscle exceeds a certain value during the image is displayed. More specifically, when the wellness system provides a virtual reality environment in which the user can drive a surface-to-air missile launching ramp and aim at an enemy plane, a detection of the active mass of a user's muscle which exceeds a certain value is utilized to trigger the launching of a missile. Accordingly, the wellness system can offer the advantage of introducing a feeling of games into training and rehabilitation by means of such the display means, so that the user can motivate himself or herself for rehabilitation.

Figure 9:
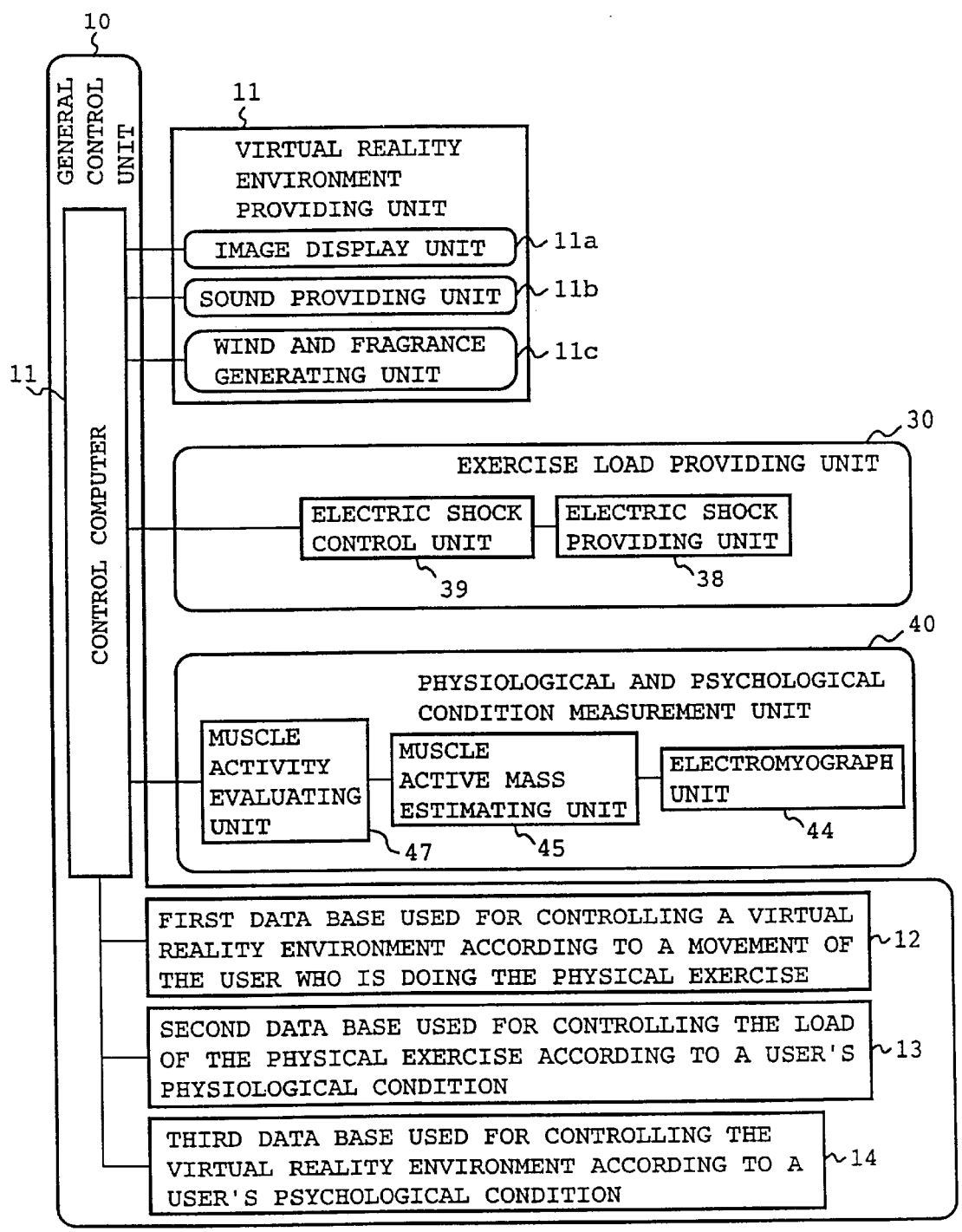
FIG. 9 is a block diagram of a wellness system according to a sixth embodiment of the present invention.

Referring next to FIG. 9, there is illustrated a block diagram showing the structure of a wellness system of a sixth embodiment of the present invention. The same components as those shown in FIG. 8 of the wellness system of the fifth embodiment are designated by the same reference numerals, and the description about the components will be omitted hereinafter. The wellness system of the sixth embodiment is adapted to apply an electric shock to a muscle of a diseased part in cast of the user to provide a pseudo load of a physical exercise in order to maintain its muscular strength, thereby preventing the user's muscle from atrophying. In FIG. 9, reference numeral 47 denotes a muscle activity evaluating unit for evaluating the activity of a muscle from the active mass of the muscle estimated by the active mass estimating unit 45. The physiological and psychological condition measurement unit 40 of the sixth embodiment is provided with the muscle activity evaluating unit 47 as well as the electromyograph unit 44 and muscle active mass estimating unit 45. Furthermore, reference numeral 38 denotes an electric shock providing unit for applying an electric shock to a specified muscle of the user, and 39 denotes an electric shock control unit for controlling the electric shock providing unit 38 according to the evaluation result by the muscle activity evaluating unit 47 of the physiological and psychological condition measurement unit 40. The exercise load providing unit 30 of the sixth embodiment is provided with the electric shock providing unit 38 and electric shock control unit 39.

In operation, electrodes of the electric shock providing unit 38, through which an electric shock is applied, and electrodes of the electromyograph unit 44, through which a muscular electric current is measured, are mounted to a diseased part of the user which is surrounded and fixed by a cast, in advance of providing the user with a pseudo load of a physical exercise. It is needless to say that the user cannot move the muscle of the diseased part in cast at the user's motive and it is difficult for another person to activate the user's muscle of the diseased part in cast. The wellness system of the present embodiment can apply a small amount of current to the muscle of the diseased part through the electrodes used for the purpose to shrink the muscle by means of the electric shock dividing unit 38 of the exercise load providing unit 30. The electromyograph unit 44 of the physiological and psychological condition measurement unit 40 acquires an electromyogram of the muscle, and then the muscle active mass estimating unit 45 estimates the activity of the muscle by analyzing the electromyogram measured. The muscle activity evaluating unit 47 evaluates the activity of the muscle from the active mass of the muscle estimated by the muscle active mass estimating unit 45, and furnishes the evaluation result to the control computer 11 of the general control unit 10.

When the control computer 11 receives the evaluation result, it instructs the exercise load providing unit 30 to allow the electric shock control unit 39 to determine the strength of electric shocks, duration of each of the electric shocks, and frequency of the electric shocks from the evaluation result of the muscle activity. The electric shock control unit 39 controls the electric shock providing unit 38 according to the strength of the electric shocks, duration of each of the electric shocks, and frequency of the electric shocks, which have been determined by the electric shock control unit. Then, the electric shock providing unit 38 applies electric shocks with the electric shock strength, duration, and frequency to the muscle of the user through the electric shock electrodes attached to the diseased part in cast. It is preferable to measure the magnitude of an electric shock which causes the muscle of the user to shrink, but does not cause the user to feel the apply of the electric shock, in advance of providing electric shocks for rehabilitation, and to start to use the wellness system by initially setting the magnitude of electric shocks to be applied to the measured magnitude.

As previously explained, the electric shock control unit 39 determines the strength of electric shocks to be applied, duration of each of the electric shocks, and frequency of the electric shocks on the basis of the frequency of the activity of the muscle and the number of pulses which correspond to the activity of the muscle at a certain level or more. The wellness system can initially set the magnitude of electric shocks to a value which causes the muscle of the user to shrink, but does not cause the user to feel the apply of the electric shock. In addition, the wellness system can be adapted to store the history of measured data about the user every when the user uses the wellness system, and then vary the pattern of electric shocks to be applied to the diseased part of the user according to the recovery process of the diseased part. Furthermore, the wellness system can inform a doctor or a trainer of a state of the muscle activity and the pattern of electric shocks varying with time, so that the electric shock control unit 39 can reflect a doctor's or trainer's judgement so as for the doctor or trainer to operate the wellness system with safety.

As previously explained, the exercise load providing unit 30 according to the sixth embodiment can provide a pseudo load of a physical exercise by applying electric shocks to a muscle of a diseased part in cast of a user. Accordingly, when a load of a physical exercise from outside cannot be applied forcefully to the user, the wellness system can provide a pseudo load of a physical exercise for maintaining the muscular strength of the muscle of the diseased part in cast of the user by applying electric shocks to the muscle to keep a reduction in the muscular strength to a minimum. As a result, the wellness system makes it possible to shorten a period of time required for rehabilitation and hence accelerate recovery of muscular strength.

Figure 10:
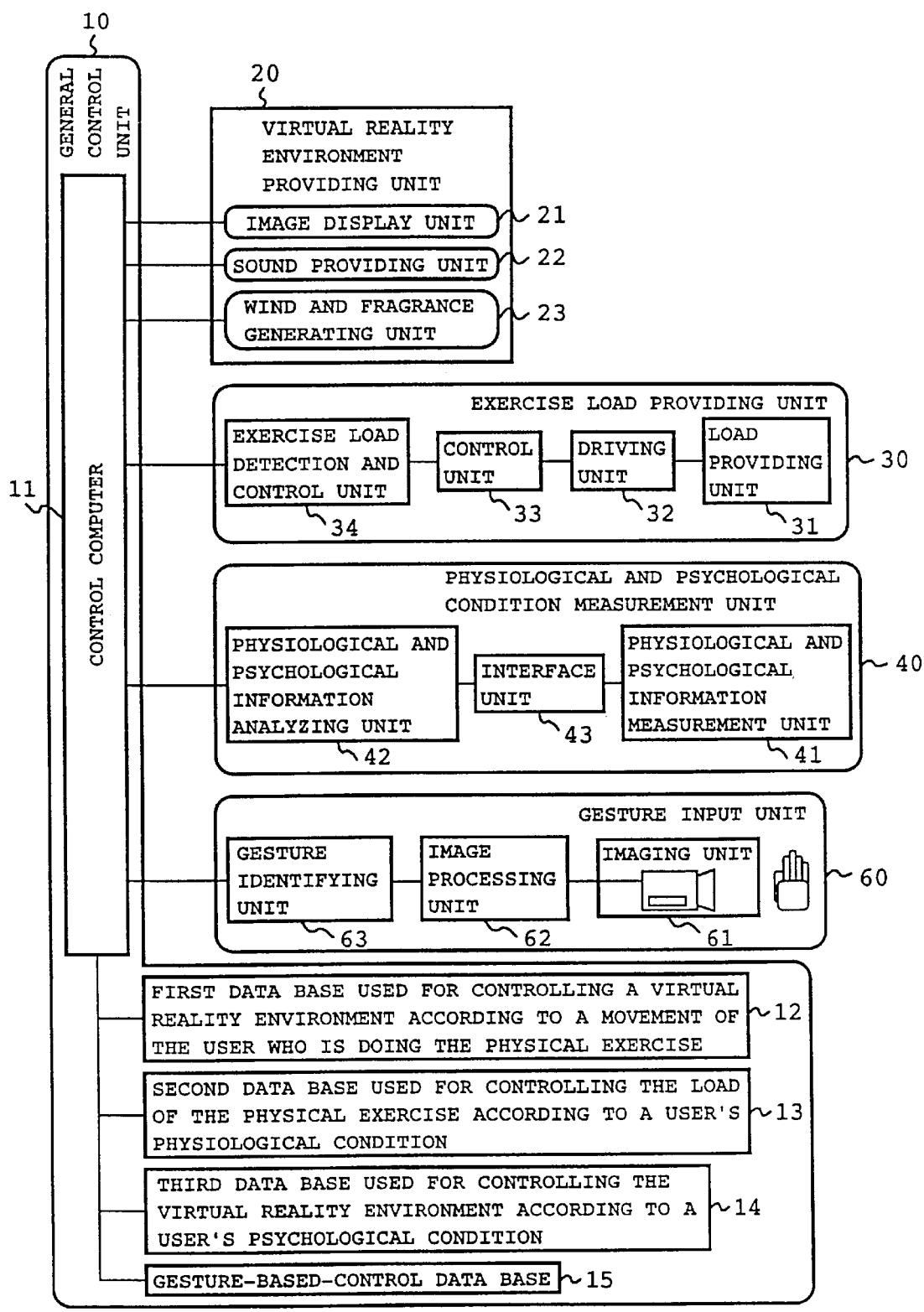
FIG. 10 is a block diagram of a wellness system according to a seventh embodiment of the present invention.

Referring next to FIG. 10, there is illustrated a block diagram showing the structure of a wellness system of a seventh embodiment of the present invention. The same components as those shown in FIG. 1 of the wellness system of the first embodiment are designated by the same reference numerals, and the description about the components will be omitted hereinafter. The wellness system of the seventh embodiment is adapted to activate and deactivate its operation, and control the provision of a virtual reality environment and a load of a physical exercise, according to a user's gesture. In FIG. 10, reference numeral 60 denotes a gesture input unit for identifying a gesture that a user makes and then furnishing the identifying result to the control computer 10 of the control unit 11, 61 denotes an imaging unit disposed in the gesture input unit 60, for taking an image of a part of the body of the user who makes a gesture with the part of the body, 62 denotes an image processing unit disposed in the gesture input unit 60, for processing image information taken by the imaging unit 61 so as to extract image parameters representing the meaning of the gesture, such as the shape and an angle of a user's hand, and the center position of the user's hand, and 63 denotes a gesture identifying unit disposed in the gesture input unit 60, for identifying the gesture that the user has made on the basis of the image parameters obtained by the image processing unit 62 and furnishing the identifying result to the control computer 11 of the general control unit 10. Furthermore, reference numeral 15 denotes a gesture-based-control data base which is disposed in the general control unit 10, and which can be referred by the control computer 11 when it activates and deactivates the operation of the wellness system, and control the virtual reality environment providing unit 20 and the exercise load providing unit 30 according to the type of the gesture identified by the gesture identifying unit 63 of the gesture input unit 60.

In operation, when the user wants to start or terminate the wellness system, or when the user wants to change the virtual reality environment on-screen or the load of a physical exercise which the user is doing, the user can do that by making a predetermined gesture with a part of the user's body such as a hand. The imaging unit 61 of the gesture input unit 60 takes an image of the part of the user's body which makes the gesture and then furnishes the image information obtained to the image processing unit 62. The image processing unit 62 performs a predetermined image processing on the image information furnished thereto to calculate image parameters required for identifying the gesture which the user has made and furnish the image parameters to the gesture identifying unit 63. The gesture identifying unit 63 can identify the gesture which the user has made according to an algorithm for obtaining a correspondence between a pattern (e.g., values and variations in values which vary with time) of image parameters pre-registered and types of gestures, and furnish the identifying result to the general control unit 10. The control computer 11 of the general control unit 10 refers to the gesture-based-control data base 15, which is used for controlling the wellness system according to a user's gesture, according to the identifying result from the gesture input unit 60, which informs the general control unit 10 of the meaning of the gesture which the user has made, and then the control computer 11 of the general control unit 10 activates or deactivates the wellness system, performs control such as emergency stop, or controls the provision of a virtual reality environment or the load of a physical exercise which the user is doing, according to the contents referred to of the gesture-based-control data base.

Control of the provision of a virtual reality environment on-screen is carried out as follows. For example, when the user reaches a fork in the virtual reality environment displayed on the screen of the image display unit 21 of the virtual reality environment providing unit 20 and then shows a direction in which the user will head with a direction of moving a user's hand, the gesture identifying unit 63 identifies the direction of moving the user's hand from image parameters obtained by the image processing unit 62 and then the virtual reality environment providing unit 20 causes the image display unit 21 to display an image of a branch path selected by the user on the screen thereof. When the user exhibits a user's psychological condition with a gesture, for example, when the user makes and raises a V sign showing a good feeling or when the user raises a fist showing a bad feeling, the gesture identifying unit 63 identifies the user's gesture from image parameters obtained by the image processing unit 62 and then the virtual reality environment providing unit 20 varies the virtual reality environment on-screen by referring to the third data base 14 used for controlling the virtual reality environment according to a user's psychological condition. Control of the provision of a load of a physical exercise can be carried out as follows. For example, when the user moves up and down a user's hand while pointing the palm upward, the exercise load detection and control unit 34 increases the load of a physical exercise provided for the user. On the contrary, when the user moves up and down a user's hand while pointing the palm downward, the exercise load detection control unit 34 reduces the load of a physical exercise provided for the user. The priorities of such the controls using a user's gesture must be assigned in consideration of the priorities of controls performed by the other control means. Preferably, the gesture showing the emergency stop takes precedence over all of the other controls. However, while giving a high priority to another control triggered by a user's predetermined gesture improves the performance of the control which is carried out according to the user's intention, it has a deleterious effect on the control based on the training plan which has been made by a doctor or a rehabilitation doctor. Therefore, it is preferable to assign priorities to controls triggered by user's predetermined gestures according to the purpose of the rehabilitation training and the physical strength and degree of recovery of the user.

Thus, the user can handle the wellness system of this embodiment by himself or herself by making a gesture that is easy to learn, without having to use a special input device such as a remote controller. This means that the wellness system can not only allow the user to handle the system, but have a user interaction function of allowing the user to work upon the wellness system autonomously. Such the user interaction encourages the user to face rehabilitation aggressively. Furthermore, since the user can move around in the virtual reality environment autonomously, the user can refresh himself or herself more effectively.

Figure 11:
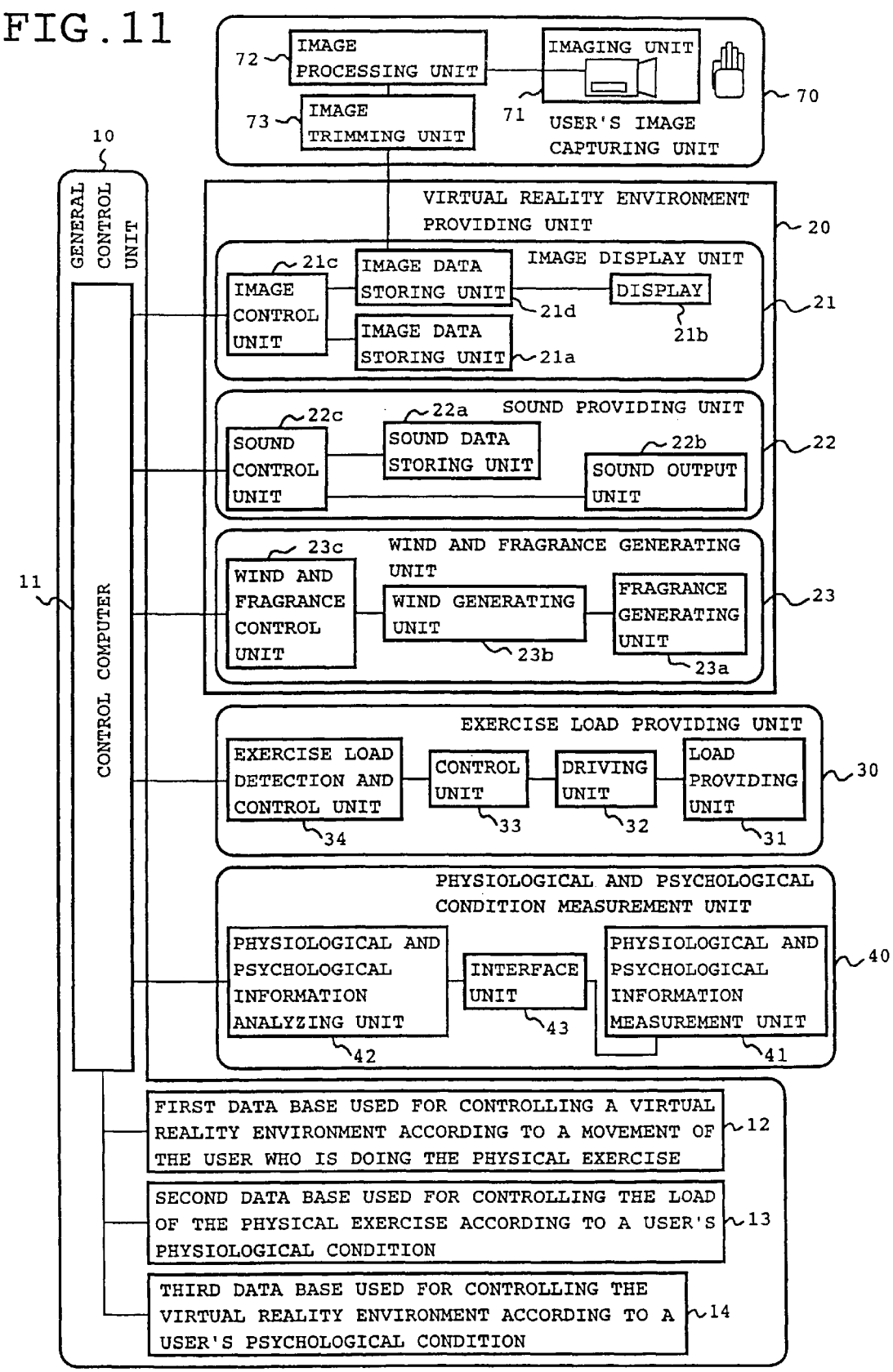
FIG. 11 is a block diagram of a wellness system according to an eighth embodiment of the present invention.

Referring next to FIG. 11, there is illustrated a block diagram showing the structure of a wellness system of an eighth embodiment of the present invention. The same components as those shown in FIG. 1 of the wellness system of the first embodiment are designated by the same reference numerals, and the description about the components will be omitted hereinafter. The wellness system of the eighth embodiment is adapted to add to the realism by displaying a part of the body of the user on the screen so that the user can see the part of the body in the virtual reality environment on-screen. In FIG. 10, reference numeral 71 denotes an imaging unit for taking an image of a part of the user's body, 72 denotes an image processing unit for performing an image processing on the image taken by the imaging unit, and 73 denotes an image trimming unit for trimming the image so as to extract a needed part of the image including the part of the user's body. Furthermore, reference numeral 70 denotes a user's image capturing unit comprised of the imaging unit 71, image processing unit 72, and image trimming unit 73, and connected to the image display unit 21 of the virtual reality environment providing unit 20. In addition, reference numeral 21*d* denotes disposed in the image display unit 21 of the virtual reality environment providing unit 20, for superimposing the image extracted by the image trimming unit 73 of the user's image capturing unit 70 on the image of a virtual reality environment to be offered to produce and display the composite screen image on the screen of the display 21*b*.

In operation, the imaging unit 71 of the user's image capturing unit 70 takes an image of a part of the user's body, e.g., feet or the end of a hand, and then furnishes the image to the image processing unit 72. The image processing unit 72 converts the image furnished by the imaging unit 71 into an image in a form that the wellness system can handle and then furnishes the converted image to the image trimming unit 73. The image trimming unit 73 trims the converted image from the image processing unit 72 to extract a needed part of the image including the part of the user's body by utilizing a contrast and a luminance difference between the background image and the user's body, and then furnishes the extracted image to the image display unit 21 of the virtual reality environment providing unit 20. The image superimposing unit 21*d* of the image display unit 21 superimposes the image extracted by the image extracting unit 73 of the user's image capturing unit 70 on the image of the virtual reality environment read out of the image storing unit 21*a* to produce and display the composite screen image on the screen of the display 21*b*.

For example, by taking an image of the whole of the body of the user who is stepping for rehabilitation, and superimposing the image on an image of a virtual forest to produce and display the composite screen image on the screen of the display, the wellness system can provide the user with a virtual reality environment in which the user walk in the forest, thereby adding to the realism and hence motivating the user to do a rehabilitation physical exercise more strongly. In addition, by taking an image of the user's face and superimposing the image on an image of a virtual reality environment in which the user is staying to produce and display the composite screen image on the screen of the display, the wellness system can cause the user to entertain friendly sentiments toward the place where the user is staying and recognize the place. Especially, when the user is a child, the wellness system can encourage the user to face rehabilitation aggressively. Furthermore, by making an image of a part of the user's body which the user can see while stepping on the wellness system, for example, feet or a hand which can be viewed from the user's eyes with a camera attached to the user's head, and superimposing the image on an image of a virtual reality environment to produce and display the composite screen image on the screen of the display, the wellness system of this embodiment can provide the realism that causes the user to feel as if the user enters the virtual reality environment.

Figure 12:
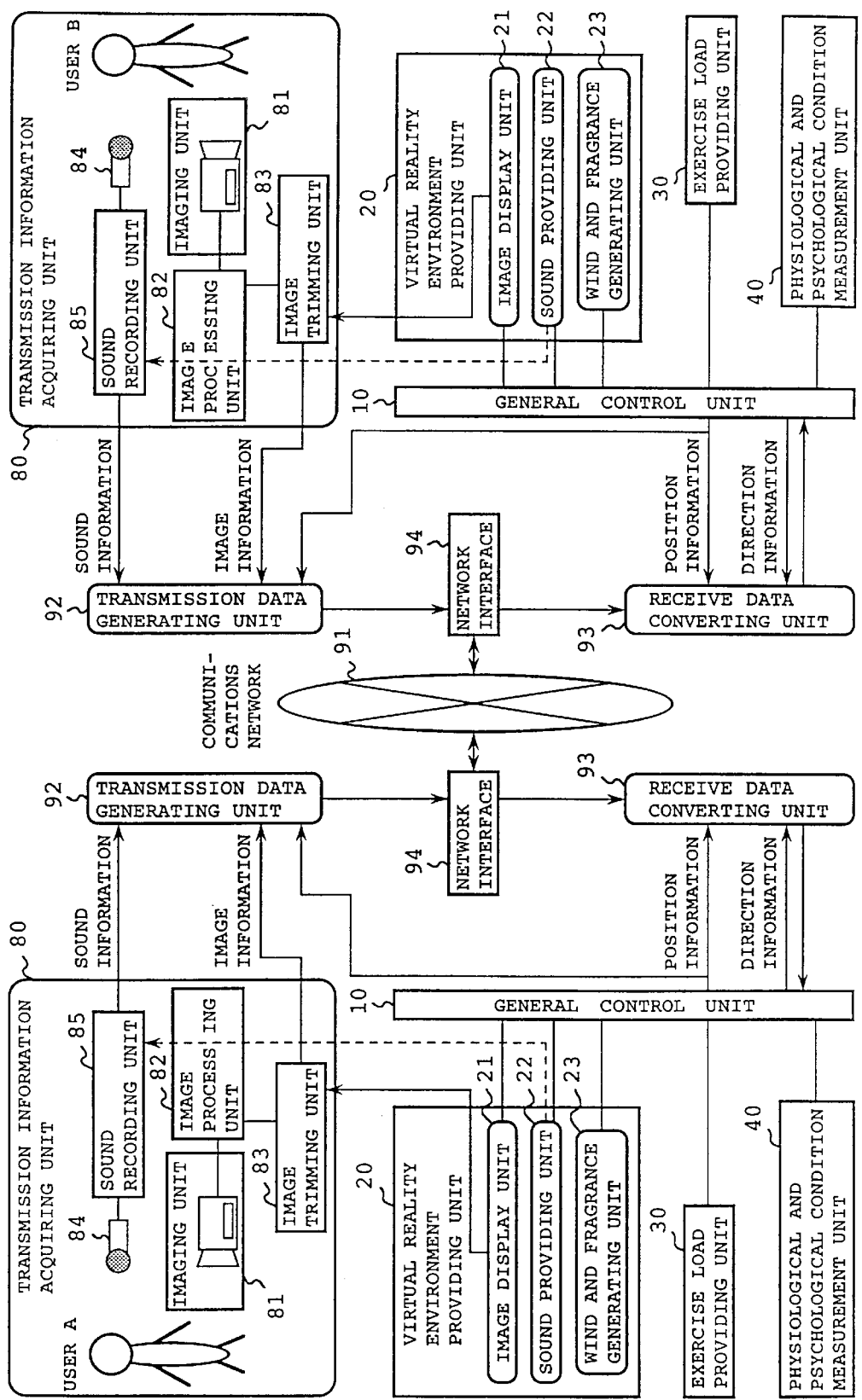
FIG. 12 is a block diagram of a wellness system according to a ninth embodiment of the present invention.

Referring next to FIG. 12, there is illustrated a block diagram showing the structure of a wellness system of a ninth embodiment of the present invention. The same components as those shown in FIG. 1 of the wellness system of the first embodiment are designated by the same reference numerals, and the description about the components will be omitted hereinafter. The wellness system of the ninth embodiment is adapted to communicate with a plurality of other wellness systems so that the user can meet and communicate with other persons who are using the respective other wellness systems. In FIG. 12, reference numeral 80 denotes an information acquiring unit for acquiring information about an image and sounds which are associated with the user and are to be transmitted, 81 denotes an imaging unit for taking an image of at least a part of the user's body, 82 denotes an image processing unit for performing an image processing on the image made by the imaging unit, and 83 denotes an image trimming unit for trimming the image so as to extract a needed part of the image including the part of the user's body. These units are the same as those included in the user's image capturing unit 70 of the wellness system of the eighth embodiment. In addition, reference numeral 84 denotes a microphone for gathering a sound generated by the user, and 85 denotes a sound recording unit for recording sound information gathered by the microphone 84. The information acquiring unit 80 is provided with the imaging unit 81, image processing unit 82, image trimming unit 83, microphone 84, and sound recording unit 85.

Furthermore, 91 denotes a communications network through which a plurality of wellness systems can communicate with each other, 92 denotes a transmission data generating unit for converting the image and sound information from the transmission information getting unit 80, and information about the position of the user in the virtual reality environment from the general control unit 10, into transmission data in a predetermined transmission format so as to transmit the transmission data by way of the communications network 91 to at least another wellness system, 93 denotes a received data converting unit for receiving the position information about the user's position in the virtual reality environment and direction information about a direction in which the user is headed in the virtual reality environment or a direction toward which the user faces from the general control unit 10 and converting the transmission data furnished thereto by way of the communications network 91 into data required for constructing a virtual reality environment in which the user can communicate with at least another person, so as to furnish the converted data to the general control unit 10, and 94 denotes a network interface for connecting the transmission data generating unit 92 and received data converting unit 93 to the communications network 91. The plurality of wellness systems each provided with the general control unit 10, virtual reality environment providing unit 20, exercise load providing unit 30, physiological and psychological condition measurement unit 40, transmission information acquiring unit 80, transmission data generating unit 92, received data converting unit 93, and network interface 94 are connected to each other by way of the communications network 91. FIG. 12 shows an example of this embodiment including two wellness systems which are so constructed.

In the transmission information acquiring unit 80, the imaging unit 81 takes an image of at least a part of the user's body, such as the user's face, or the whole of the user's body, and the image processing unit 82 converts the image into data in a form that can be handled by the system. The image trimming unit 83 trims the image so as to extract and furnish a needed part of the image including the part of the user's body to the image display unit 21 of the virtual reality environment providing unit 20 and also the transmission data generating unit 92 in the same wellness system. Furthermore, the wellness system acquires a sound that the user makes by means of the microphone 84 and then records the sound as sound data by means of the sound recording unit 85. The sound data is furnished to the transmission data generating unit 92. Preferably, user's voices and the sound of footsteps, and sounds made in surroundings are acquired with a plurality of good-directional microphones 84 and a plurality of sound recording units 85 such that the user's voices and sound of footsteps are isolated from the sounds made in surroundings. Alternatively, the wellness system can acquire a sound which the user actually makes by means of the microphone 84, while it can directly furnish sound information which is generated and provided by the sound providing unit 22 of the virtual reality environment providing unit 20 to the sound recording unit 85, as indicated by a dotted line in FIG. 12. The general control unit 10 holds information about the user's position in the virtual reality environment, and updates the position information according to information from the exercise load providing unit 30 and then furnishes the updated position information to the transmission data generating unit 92.

When the transmission data generating unit 92 receives the image and sound information from the transmission information acquiring unit 80 and the position information from the general control unit 10, it converts them to communications data in a predetermined communications format which complies with a protocol of the communications network 91 so as to furnish the communications data together with a code for identifying the user onto the communications network 91 by way of the network interface 94.

When the received data converting unit 93 of the wellness system receives a code for identifying another person who is using another wellness system, information about an image and sounds associated with the other user, and information about the position of the other user in a virtual reality environment provided by the other wellness system, which have been transmitted by way of the communications network 91 by the transmission data generating unit 92 of the other wellness system, the received data transforming unit 93 determines a relationship between the user's position in the virtual reality environment and the position of the other person in the other virtual reality environment provided by the other wellness system from the above information received and information about the user's position and direction in which the user is headed in the virtual reality environment from the general control unit 10 of the same wellness system. If the other person is within a predetermined distance from the user in the virtual reality environment, the received data converting unit 93 furnishes the sound information from the other wellness system together with information about a direction from which the sound made in the other wellness system comes, which is calculated from the above relationship, to the general control unit 10. Simultaneously, the received data transforming unit 93 searches the image information from the other wellness system and selects a part of the image that can be viewed in the virtual reality environment on the basis of the direction information showing the direction in which the user is headed in the virtual reality environment and the position information about the other person, and then transforms the part into an image that can be viewed from the user's position and furnishes the image to the general control unit 10.

The control unit 10 furnishes the image information from the received data converting unit 93 together with a signal for controlling the virtual reality environment to the image display unit 21 of the virtual reality environment providing unit 20, and also furnishes the sound information to the sound providing unit 22. The image display unit 21 reads information about an image, which produces an original virtual reality environment, stored in the image storing unit according to the signal for controlling the virtual reality environment from the general control unit 10, and then superimposing the image information associated with the other person, which has been furnished by the general control unit 10, and the image information associated with the user, which has been furnished by the transmission information acquiring unit 80, on the above image of the virtual reality environment so as to produce and display the composite screen image on the display of the wellness system. The sound providing unit 22 chooses sound information stored in the sound data storing unit according to the signal for controlling the virtual reality environment from the general control unit 10 and then synthesizes the sound information and the information about a sound that the other person has made, which has been furnished by the general control unit 10, by using the direction information so as to offer the synthesized sound to the user.

Thus, the wellness system of this embodiment can provide a common virtual space in which the user can meet a plurality of other persons, have a conversation with other persons while looking the persons in the faces or seeing how the persons are, and going for a walk with other persons. Such a common virtual space makes it possible to encourage the user to motivate himself or herself when the user does a rehabilitation physical exercise or receives exercise treatment. Furthermore, the user can refresh himself or herself by virtue of communication with other persons. Various types of communication can be made. For example, the user and another patient can exchange information about their progress toward recovery or methods of treatment. Furthermore, the user can demand an explanation of the progress toward recovery or consult with a medical authorized person such as a doctor or a rehabilitation doctor by way of the communications network. The medical authorized person can also cheer up the user through communication made by way of the communications network. In addition, the user can have a conversation about everyday life or the user's impressions of the virtual reality with the user's family or a helper. Thus, the wellness system provides a virtual reality environment that can produce a relaxed atmosphere in which the user can smoothly communicate with other persons. Furthermore, the wellness system of this embodiment can cause the user to feel as if the user holds space and time in common with other persons, thereby encouraging the user to create social relationships with other persons.

Figure 13:
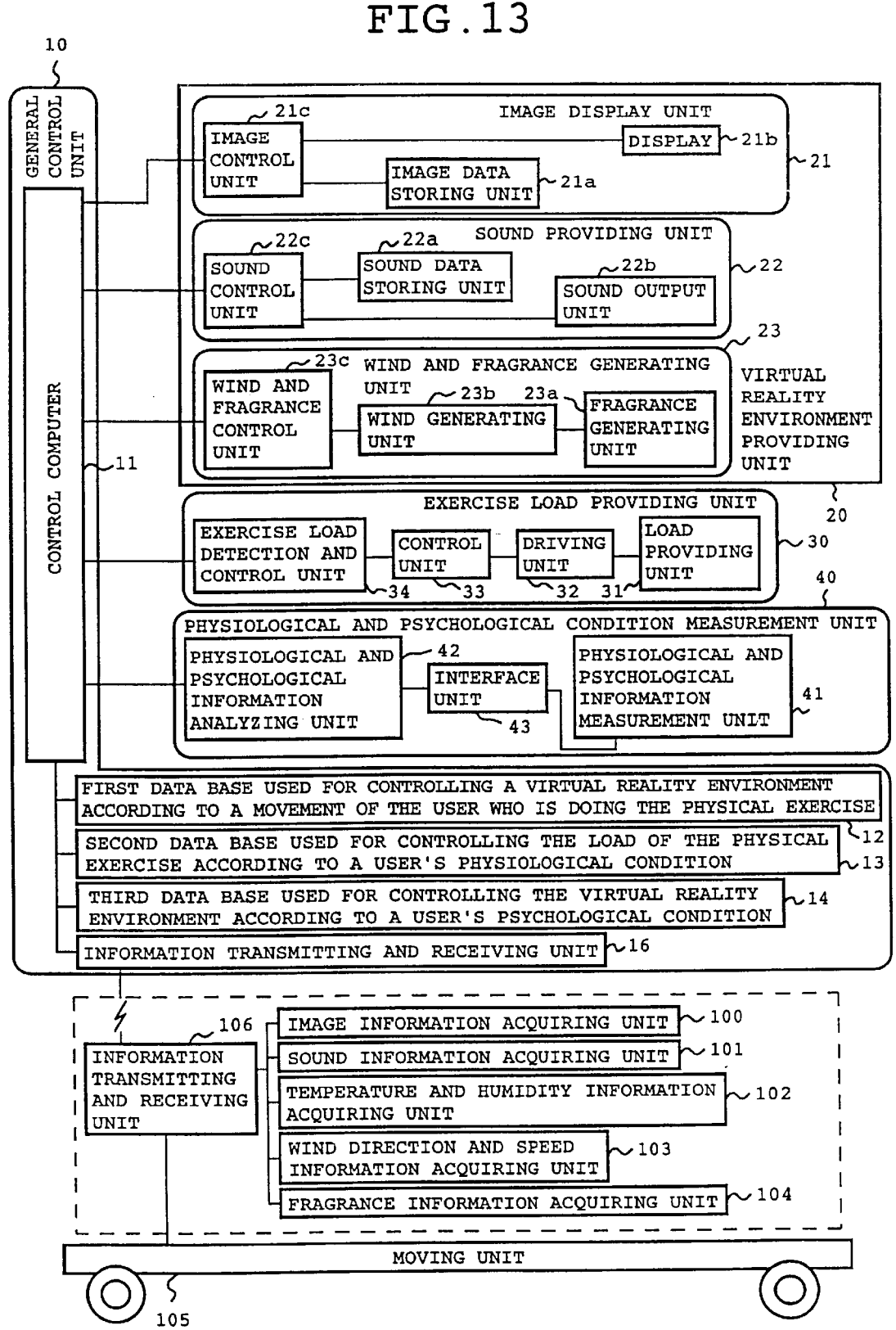
FIG. 13 is a block diagram of a wellness system according to a tenth embodiment of the present invention.

Referring next to FIG. 13, there is illustrated a block diagram showing the structure of a wellness system of a tenth embodiment of the present invention. The same components as those shown in FIG. 1 of the wellness system of the first embodiment are designated by the same reference numerals, and the description about the components will be omitted hereinafter. The wellness system of the tenth embodiment is adapted to provide a virtual reality environment through which the user who is apart from a real environment can make contact with the real environment. In FIG. 13, reference numeral 100 denotes an image information acquiring unit for acquiring information about an image of an object in a real environment which is apart from the user, 101 denotes a sound information acquiring unit for acquiring information about sounds (or a sound field) made in the real environment, 102 denotes a temperature and humidity information acquiring unit for acquiring information about the temperature and humidity of the real environment, 103 denotes a wind direction and speed information acquiring unit for acquiring information about the direction and speed of a wind blowing in the real environment, and 104 denotes a fragrance information acquiring unit for acquiring information about fragrance emitted out of the real environment.

A moving unit 105 in which the image information acquiring unit 100, sound information acquiring unit 101, temperature and humidity information acquiring unit 102, wind direction and speed information acquiring unit 103, and fragrance information acquiring unit 104 are mounted is adapted to carry them. An information transmitting and receiving unit 106 mounted in the moving unit 105 transmits the information acquired by the image information acquiring unit 100, sound information acquiring unit 101, temperature and humidity information acquiring unit 102, wind direction and speed information acquiring unit 103, and fragrance information acquiring unit 104 to the general control unit 10, and receives information for controlling movements of the moving unit 105 from the general control unit 10. An information transmitting and receiving unit 16 disposed in the general control unit 10 receives the information acquired by the image information acquiring unit 100, sound information acquiring unit 101, temperature and humidity information acquiring unit 102, wind direction and speed information acquiring unit 103, and fragrance information acquiring unit 104 from the information transmitting and receiving unit 106, and transmits information for controlling movements of the moving unit 105.

In operation, the control computer 11 of the general control unit 10 controls the virtual reality environment providing unit 20 according to the information acquired by the image information acquiring unit 100, sound information acquiring unit 101, temperature and humidity information acquiring unit 102, wind direction and speed information acquiring unit 103, and fragrance information acquiring unit 104, which has been received by the information transmitting and receiving unit 16, so as to provide the user with a virtual reality environment which originates from a real environment in which the moving unit 105 is placed, by means of the image display unit 21, sound providing unit 22, and fragrance and wind generating unit 23. When the user does a stepping exercise, the exercise load providing unit 30 detects a movement of the user who is doing the physical exercise and then furnishes the detected information to the control computer 11. The control computer 11 creates information for controlling movements of the moving unit 105 from the detected information, and then furnishes it to the information transmitting and receiving unit 106 of the moving unit 105 by means of the information transmitting and receiving unit 16.

The moving unit 105 operates under the control of the received information for controlling movements of the moving unit, and moves according to the movement of the user who is doing the physical exercise. For example, when the user makes one step, the moving unit moves by the distance of one step. Accordingly, the moving unit 105 carries the image information acquiring unit 100, sound information acquiring unit 101, temperature and humidity information acquiring unit 102, wind direction and speed information acquiring unit 103, and fragrance information acquiring unit 104, which are mounted in the moving unit, according to the physical exercise that the user is doing. These information acquiring units acquire information about images, information about sounds, and information about the real environment such as temperature, humidity, the direction of wind, the speed of wind, and fragrance at a number of places, during the interval that the moving unit is moving. The acquired information is transmitted to the information transmitting and receiving unit 16 of the general control unit 10 by the transmitting and receiving unit 106, and is further furnished to the control computer 11. The control computer 11 controls the virtual reality environment providing unit 20 according to the information received and then provides the user with a virtual reality environment showing the real environment to which the moving unit has been moved, by means of the image display unit 21, sound providing unit 22, and wind and fragrance unit 23.

For example, when the contents of a physical exercise that the user is doing are about walking in a park, the moving unit 105 in which the image information acquiring unit 100, sound information acquiring unit 101, temperature and humidity information acquiring unit 102, wind direction and speed information acquiring unit 103, and fragrance information acquiring unit 104 are mounted is placed in the park. The user can use the wellness system of this embodiment while lying on a bed. When the user does a stepping exercise, the moving unit 105 moves according to the user's steps together with the plurality of information acquiring units mounted in the moving unit and transmits the movement information including information about images, sounds, and the real environment to the control computer by way of the information transmitting and receiving units 106 and 16, which makes the appropriate changes to the on-screen image provided by the virtual reality environment providing unit 20, and wind, sounds, fragrance, and so on. For example, as the user moves closer to a flower garden, the on-screen image is changed such that flowers in the flower garden move closer to the user gradually and the fragrance of the flowers becomes stronger. Furthermore, when the user continues to do a stepping exercise near the flower garden in the virtual reality environment, the kinds of flowers on the on-screen image are varied and the fragrance emitted out of the wellness system is varied according to a variation in the kinds of on-screen flowers. In addition, when a child is playing in the real environment which is the source of the virtual reality environment, the onscreen image and sound provided by the virtual reality environment providing unit are varied in real time according to movements of the child.

As previously mentioned, the wellness system of this embodiment can cause the user to feel as if the user enters a real environment even though the user is apart from the real environment. Accordingly, the wellness system offers the advantage of being able to encourage the user to motivate himself or herself to do a rehabilitation physical exercise. Furthermore, the wellness system can provide interaction with a real world for any other purposes other than rehabilitation, thereby releasing the user from the stress of being confined in a room of a hospital or the user's house and hence causing the user to refresh himself or herself.

Figure 14:
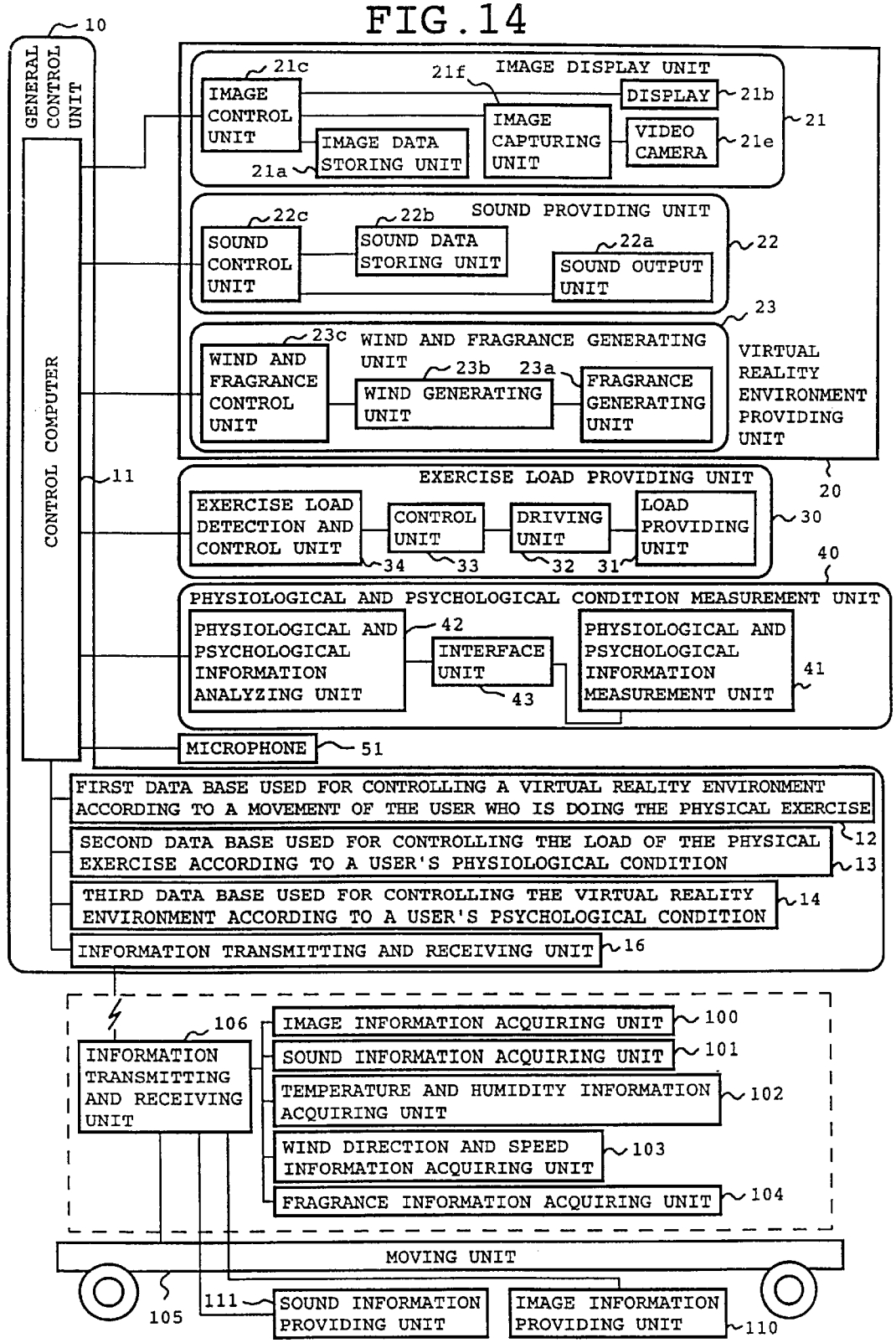
FIG. 14 is a block diagram of a wellness system according to an eleventh embodiment of the present invention.
Figure 15:
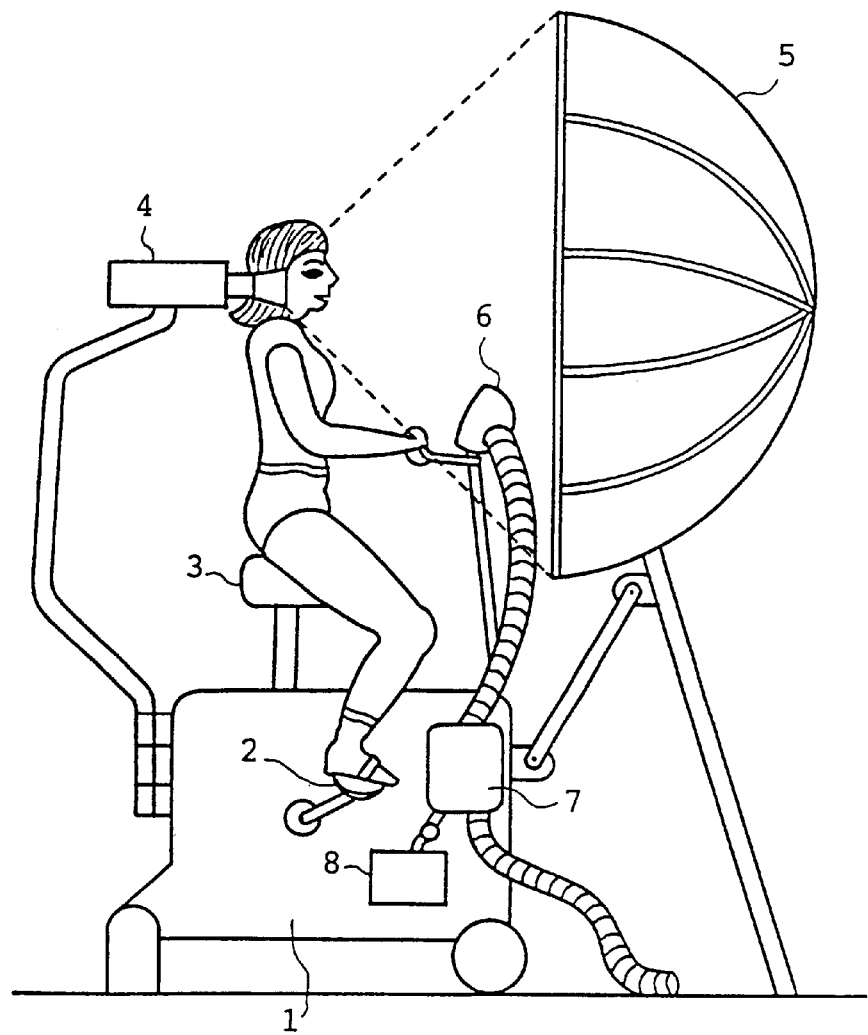
FIG. 15 is a schematic diagram of a prior art wellness system.

Referring next to FIG. 14, there is illustrated a block diagram showing the structure of a wellness system of an eleventh embodiment of the present invention. The same components as those shown in FIG. 13 of the wellness system of the tenth embodiment are designated by the same reference numerals, and the description about the components will be omitted hereinafter. The wellness system of the eleventh embodiment is adapted to provide a virtual reality environment through which the user can make interact with other persons who are staying in a real environment which is the source of the virtual reality environment. In FIG. 14, reference numeral 21e denotes a video camera disposed in the image display unit 21 of the virtual reality environment providing unit 20, for taking an image of at least a part of the user's body or the whole of the user's body so as to acquire image information about the user, 21f denotes an image capturing unit for capturing the image information acquired by the video camera 21e and then furnishing it to the image control unit 21c, and 51 denotes a microphone for acquiring information about sounds which the user makes and furnishing it to the control computer 11 of the general control unit 10.

Furthermore, reference numeral 110 denotes an image information providing unit for receiving the image information about the user, which has been acquired by the video camera 21e of the image display unit 21 and has been captured by the image capturing unit 21f, and which has been transmitted to the control computer 11 by the image control unit 21c, transmitted thereto by way of the information transmitting and receiving units 16 and 106, so as to provide the image information for other persons staying in the real world which is the source of the virtual reality environment provided for the user, and 111 denotes a sound information providing unit for receiving the sound information about the user, which has been acquired by the microphone 51 and which has been transmitted by the control computer 11, transmitted thereto by way of the information transmitting and receiving units 16 and 106, so as to provide the sound information for other persons staying in the real world which is the source of the virtual reality environment provided for the user.

For example, when the user who stays in hospital uses the wellness system of the eleventh embodiment in order to interact with the user's family that is staying in a sight-seeing resort, the image information acquiring unit 100, sound information acquiring unit 101, temperature and humidity information acquiring unit 102, wind direction and speed information acquiring unit 103, fragrance information acquiring unit 104, information transmitting unit 106, image information providing unit 110, and sound information providing unit 111 which are mounted in the moving unit 105 are placed in the sight-seeing resort, while the other components of the wellness system are placed in the hospital in which the user stays. The wellness system acquires information about an image of parts of the bodies of members of the user's family or the whole of the bodies of all of the members, an image of a piece of scenery in the sight-seeing resort, sounds which the members of the user's family make, and sounds made in surroundings in the sight-seeing resort, by means of the image information acquiring unit 100 and sound information acquiring unit 101 which are placed in the sight-seeing resort. The acquired image and sound information is transmitted to the main body of the wellness system place in the hospital by the information transmitting and receiving unit 106. The wellness system receives the information transmitted thereto through the information transmitting and receiving unit 16, and furnishes it to the control computer 11 of the general control unit 10. The control computer 11 controls the virtual reality environment providing unit 20 on the basis of the information transmitted thereto so as to provide how the members of the user's family staying in the sight-seeing resort are for the user staying in the hospital.

The wellness system acquires information about an image of a part of the body of the user who is staying in the hospital or the whole of the user's body by means of the video camera 21e of the image display unit 21 of the virtual reality environment providing unit 20 which is placed in the hospital. Then, the image capturing unit 21f captures the image taken by the video camera, and the image control unit 21c transmits the captured image to the control computer 11. The control computer 11 receives the image information transmitted thereto and furnishes it to the information transmitting and receiving unit 106 which is placed in the sight-seeing resort through the information transmitting and receiving unit 16. The image information is further furnished to the image information providing unit 110 and then is provided for the members of the family. Similarly, the wellness system acquires information about sounds such as a sound which the user makes by means of microphone 51. Then, the acquired sound information is furnished to the control computer 11. The control computer 11 furnishes the sound information to the information transmitting and receiving unit 106 which is placed in the sight-seeing resort through the information transmitting and receiving unit 16. The sound information is further furnished to the sound information providing unit 111 and then is provided for the members of the family.

Thus, the wellness system of this embodiment can provide a situation in which the user feels as if the user stays together with the user's family staying in a real world which is apart from the user, such as a sight-seeing resort. Furthermore, by changing the sight-seeing resort to a schoolroom of a school, and changing the user's family to a teacher and user's friends, the wellness system of this embodiment can provide a virtual reality environment in which the user can feel as if the user goes to school while staying in hospital.

As previously mentioned, the wellness system of this embodiment can cause the user to interact with a real world and communicate with persons which stay in the real world for any other purposes other than rehabilitation, thereby releasing the user from the stress of being restrained in a room of a hospital or the user's house and hence causing the user to refresh himself or herself. Furthermore, since the wellness system can give the user an opportunity of participating in society, it is useful for the care of the mental health of the user.

As previously mentioned, the present invention offers the following advantages.

In accordance with a preferred embodiment of the present invention, there is provided a wellness system which can display an image which produces a virtual reality environment according to a movement of the user who is doing a physical exercise, which has been measured by an exercise load providing unit, while setting its angle of view to be larger than an angle of view of a corresponding object or scene which was shot by using a video camera or the like. Therefore, the wellness system of the embodiment can provide a virtual reality environment that offers and adds realism to cause the user to feel as if the user enters the screen of the virtual reality environment providing unit.

In accordance with another preferred embodiment of the present invention, there is provided a wellness system which can display an image which produces a virtual reality environment which is controlled according to a user's psychological condition evaluated by a physiological and psychological condition evaluating unit, while setting the angle of view of the image on-screen to be larger than an angle of view of a corresponding object or scene which was shot. Therefore, the wellness system of the embodiment can provide a virtual reality environment that offers and adds realism according to the evaluated user's psychological condition.

In accordance with another preferred embodiment of the present invention, there is provided a wellness system which can replay a plurality of dynamic image cuts, which were taken at a plurality of places of a real environment which is a source of the virtual reality environment, cut by cut according to a user's movement measured by the exercise load providing unit. Therefore, the wellness system can prevent the user from doing a physical exercise to excess according to an image on-screen of the virtual reality environment provided for the user.

In accordance with another preferred embodiment of the present invention, the wellness system can provide the user with a sound, a wind, and fragrance which are associated with each of the plurality of dynamic image cuts, in synchronization with the replay of each of the plurality of dynamic image cuts. Therefore, the embodiment offers the advantage of being able to cause the user to feel as if the user walks actually in a place shown by the virtual reality environment.

In accordance with another preferred embodiment of the present invention, there is provided a wellness system which can provide a negative load of a physical exercise to help the user to do a physical exercise. Accordingly, the wellness system of the embodiment can enable and help the user who cannot move by himself or herself to do a physical exercise such as a passive rehabilitation exercise by himself or herself according to his or her capacity for locomotion. Furthermore, since a user who cannot move by himself or herself can move in the virtual reality environment, the user can temporarily get rid of the stress of being confined to a bed and therefore mentally refresh himself or herself.

In accordance with another preferred embodiment of the present invention, there is provided a wellness system which can control the load of a physical exercise provided by the exercise load providing unit according to a data which defines a pattern of the physical exercise which the user is to do. Accordingly, this embodiment can provide a load of a physical exercise suitable for the user. Furthermore, the user can repeat a safe rehabilitation exercise, the contents of which can be set manually or through an exercise load data input unit by a doctor or a rehabilitation doctor when the user starts to be trained. Therefore, the wellness system of this embodiment can prevent a reduction in the chance of rehabilitation due to a short supply of rehabilitation doctors.

In accordance with another preferred embodiment of the present invention, the wellness system can comprise a position detecting sensor for detecting a position of a load providing unit of the exercise load providing unit which is manually moved by a doctor or a rehabilitation doctor according to an exercise pattern suitable for rehabilitation when the user starts to be trained, and a speed detecting sensor for simultaneously detecting the moving speed of the load providing unit which is being moved manually. Furthermore, the exercise load providing unit can use outputs from the position detecting sensor and the speed detecting sensor as the data which defines the pattern of the physical exercise which the user is to do. Accordingly, the wellness system of this embodiment offers the advantage of being able to enable a doctor or a rehabilitation doctor to input a data which defines a pattern of a physical exercise that the user does by manually moving the load providing unit according to the contents of a desired rehabilitation physical exercise.

In accordance with another preferred embodiment of the present invention, the wellness system further comprises an exercise load data input unit through which the data which defines the physical exercise pattern can be input when the user starts physical training using the wellness system. Accordingly, the wellness system offers the advantage of being able to enable the user to do a safe rehabilitation physical exercise, the contents of which has been set by a rehabilitation doctor or the like by inputting numerical data.

In accordance with another preferred embodiment of the present invention, there is provided a wellness system which can control the load of a physical exercise which the user is doing according to an active mass of a muscle estimated by a muscle active mass estimating unit from a electromyogram of the muscle measured by an electromyograph unit. Accordingly, the wellness system of this embodiment offers the advantage of being able to provide a user's muscle with a load of a physical exercise according to the active mass of the muscle, thereby preventing the user's muscle from atrophying.

In accordance with another preferred embodiment of the present invention, there is provided a wellness system which can apply an electric shock to a user's muscle through electrodes attached to a diseased part in cast according to the active mass of the muscle estimated from an electromyogram of the muscle. Accordingly, the wellness system of this embodiment offers the advantage of being able to provide a pseudo load of a physical exercise for the user in order to maintain the muscular strength, thereby keeping a reduction in the muscular strength to a minimum.

In accordance with another preferred embodiment of the present invention, there is provided a wellness system comprising which can activate or deactivate the wellness system, control the virtual reality environment providing unit, and control the exercise load providing unit, according to a user's gesture. Accordingly, the wellness system of this embodiment offers the advantage of being able to enable the user to handle the wellness system of this embodiment by himself or herself by making a gesture that is easy to learn, thereby causing the user to work upon the wellness system autonomously and face rehabilitation aggressively.

In accordance with another preferred embodiment of the present invention, there is provided a wellness system provided with a unit for taking and capturing an image of at least a part of the user's body, and a unit for superimposing the image captured on an image of the virtual reality environment to be provided to display the composite image. Accordingly, the wellness system of this embodiment offers the advantage of being able to enable the user to see the movement of the user's body in the virtual reality environment, thereby adding to the realism.

In accordance with another preferred embodiment of the present invention, there is provided a wellness system comprising a transmission information acquiring unit for acquiring information about an image and a sound associated with the user, and a transmission data generating unit for converting the information about an image and a sound acquired by the transmission information acquiring unit and information about a position of the user in the virtual reality environment, which is furnished by the control unit, into communications data in predetermined communications format so as to transmit the communications data to another wellness system by way of a communications network. Accordingly, the wellness system of this embodiment offers the advantage of being able to enable a plurality of users to meet each other and communicate with each other in the virtual reality environment.

In accordance with another preferred embodiment of the present invention, there is provided a wellness system comprising an image information acquiring unit movably disposed for acquiring information about an image of a real environment that is apart from the user, a sound information acquiring unit movably disposed for acquiring information about sounds made in the real environment that is apart from the user, an environment information acquiring unit movably disposed for acquiring information about the real environment that is apart from the user, and a control unit for moving the image information acquiring unit, the sound information acquiring unit, and the environment information acquiring unit according to a user's movement measured by the exercise load providing unit, and for controlling the virtual reality environment provided by the virtual reality environment providing unit using the information acquired by the image information acquiring unit, the sound information acquiring unit, and the environment information acquiring unit. Accordingly, the wellness system of this embodiment offers the advantage of being able to cause the user who is apart from the real environment to feel as if the user is staying in the real environment.

In accordance with a preferred embodiment of the present invention, the wellness system further comprises a user's image information acquiring unit for acquiring information about an image of at least a part of the user's body, a user's sound information acquiring unit for acquiring information about a sound that the user makes, an image information providing unit for providing the image information acquired by the user's image information acquiring unit for persons staying in the real environment which is a source of the virtual reality environment, and an image information providing unit for providing the sound information acquired by the user's sound information acquiring unit for persons staying in the real environment which is a source of the virtual reality environment. Accordingly, the wellness system of this embodiment offers the advantage of being able to enable the user who is apart from the real environment to interact with persons staying in the real environment.

Many widely different embodiments of the present invention may be constructed without departing from the spirit and scope of the present invention. It should be understood that the present invention is not limited to the specific embodiments described in the specification, except as defined in the appended claims.

What is claimed is:

1. A wellness system comprising:

an exercise load providing means for providing a load of a physical exercise for a user, and for measuring a movement of the user who is doing the physical exercise;

a virtual reality environment providing means for providing the user with a virtual reality environment according to the contents of the virtual reality environment; and a control means for controlling the virtual reality environment provided by said virtual reality environment providing means according to the user's movement measured by said exercise load providing means, and wherein said virtual reality environment providing means stores a plurality of dynamic image cuts which were taken at a plurality of places of a real environment which is a source of the virtual reality environment, and replays the dynamic image cuts cut by cut according to the user's movement measured by said exercise load providing means, wherein when said exercise providing means measures the user's movement as negligible or stopped, the dynamic image cut currently replaying is repeated continuously by said control means until said exercise providing means detects an additional movement by the user, and wherein each of the dynamic image cuts represents a fixed viewpoint and comprises a series of frames played in a forward sequence showing the fixed viewpoint, wherein a first frame in said forward sequence is similar to a last frame of the series of frames in said forward sequence so as to reduce discontinuity when the dynamic image cut is repeated continuously.

2. The wellness system according to claim 1, wherein said virtual reality environment providing means provides the user with a sound, a wind, and fragrance which are associated with each of the plurality of dynamic image cuts, in synchronization with the replay of each of the plurality of dynamic image cuts, wherein the sound does not vary significantly for a series of frames of each of the dynamic image cuts so that the sound sounds natural when a dynamic image cut is repeated continuously.

* * * * *